(12) United States Patent
Miki

(10) Patent No.: US 8,164,687 B2
(45) Date of Patent: Apr. 24, 2012

(54) COLOR DIFFERENCE SIGNAL IP CONVERSION METHOD

(75) Inventor: Yoichiro Miki, Osaka (JP)

(73) Assignee: Panasonic Corporation, Osaka (JP)

( * ) Notice: Subject to any disclaimer, the term of this patent is extended or adjusted under 35 U.S.C. 154(b) by 1070 days.

(21) Appl. No.: 12/067,576

(22) PCT Filed: Jun. 25, 2007

(86) PCT No.: PCT/JP2007/062697
§ 371 (c)(1),
(2), (4) Date: Mar. 20, 2008

(87) PCT Pub. No.: WO2008/038442
PCT Pub. Date: Apr. 3, 2008

(65) Prior Publication Data
US 2009/0002552 A1    Jan. 1, 2009

(30) Foreign Application Priority Data
Sep. 26, 2006   (JP) ................... 2006-260217

(51) Int. Cl.
    *H04N 7/01* (2006.01)
(52) U.S. Cl. .................. 348/448; 348/451; 348/452
(58) Field of Classification Search ................ None
    See application file for complete search history.

(56) References Cited

U.S. PATENT DOCUMENTS

| | | | | |
|---|---|---|---|---|
| 5,291,280 A | * | 3/1994 | Faroudja et al. | 375/240.12 |
| 5,381,183 A | * | 1/1995 | Ishizuka et al. | 348/458 |
| 5,534,935 A | | 7/1996 | Kawai et al. | |
| 5,631,706 A | * | 5/1997 | Tsunashima | 348/452 |
| 5,877,617 A | * | 3/1999 | Ueda | 323/316 |
| 6,421,090 B1 | * | 7/2002 | Jiang et al. | 348/452 |
| 7,006,147 B2 | * | 2/2006 | Willis | 348/448 |
| 7,057,664 B2 | * | 6/2006 | Law et al. | 348/448 |
| 7,064,790 B1 | * | 6/2006 | Varma et al. | 348/441 |
| 7,423,691 B2 | * | 9/2008 | Orlick et al. | 348/448 |
| 2002/0080268 A1 | | 6/2002 | Willis | |
| 2004/0201777 A1 | * | 10/2004 | Zhu et al. | 348/448 |

FOREIGN PATENT DOCUMENTS

| | | |
|---|---|---|
| JP | 2002-44425 | 2/2002 |
| JP | 2004-153669 | 5/2004 |
| JP | 2004-236012 | 8/2004 |
| JP | 2006-005424 | 1/2006 |
| JP | 2006-121568 | 5/2006 |
| WO | WO 97/13375 | 4/1997 |
| WO | WO 02/052849 A1 | 7/2002 |

* cited by examiner

*Primary Examiner* — Brian Pendleton
*Assistant Examiner* — Fernando Alcon
(74) *Attorney, Agent, or Firm* — McDermott Will & Emery LLP

(57) ABSTRACT

An output of a conventional color-difference inter-field interpolating unit (10) and an output obtained by a color-difference 4:2:0 inter-field interpolating unit (11) and a color-difference intra-field line interpolating unit (12) as a progressive signal through inter-field interpolation by changing a 4:2:2 color-difference signal into a 4:2:0 color-difference signal are switched by a color-difference static image processing method selecting/mixing unit (14) in accordance with an output or the like of a detecting unit (13) for detecting a characteristic of an image signal. Thus, it is possible to realize color-difference signal IP conversion static image processing in which degradation of a correct 4:2:2 color-difference signal is suppressed and jaggy is reduced with respect to a 4:2:2 color-difference signal obtained through interpolation of a 4:2:0 signal.

13 Claims, 22 Drawing Sheets

```
1111111111111110110111111111111111111111111111
0000000000000000000000000000000000000000000000
1111111111101111111111111111011101111111101111
0000000000000000000000000000000000000000000000
1111111111111111111111111111111111111110010111
0000000000000000000000000000000000000000000000
1111111111011111111111011111111111111111011111
0000000000000000000000000000000000000000000000
1111111111111111111111110111111111101111111111
0000000000000000000000000000000000000000000000
1111111111110111111111011111111111101111111111
```

FIG. 17A
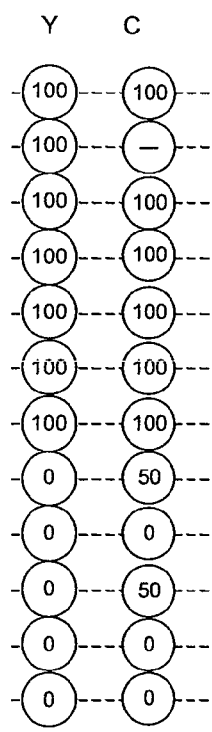
28X
PROGRESSIVE
INCLUDING JAGGY
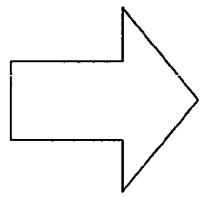
VERTICAL 3-TAP
MEDIAN FILTER
FIG. 17B
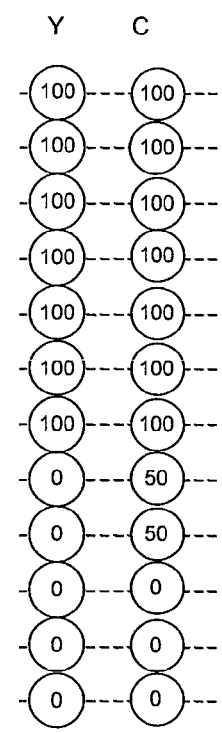
28Y FIG. 18A
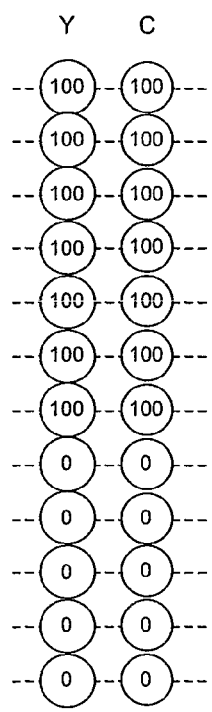
28X
PROGRESSIVE NOT
INCLUDING JAGGY
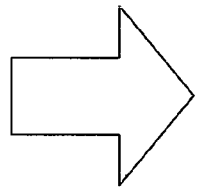
VERTICAL 3-TAP
MEDIAN FILTER
FIG. 18B
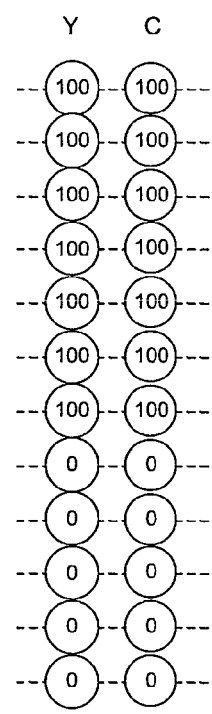
28Y

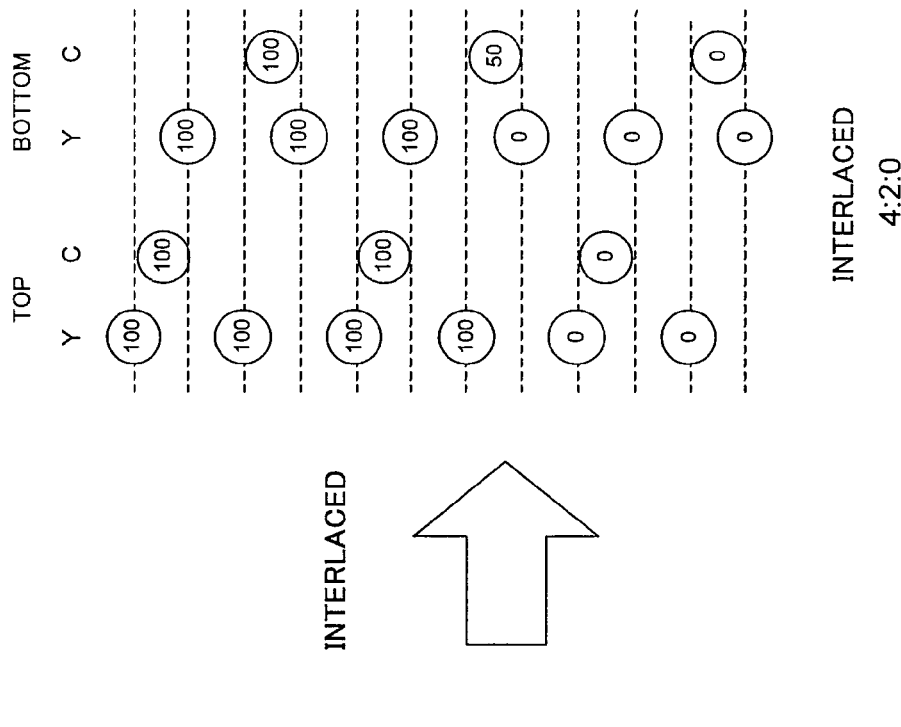
FIG. 22C PRIOR ART
FIG. 22B PRIOR ART
FIG. 22A PRIOR ART
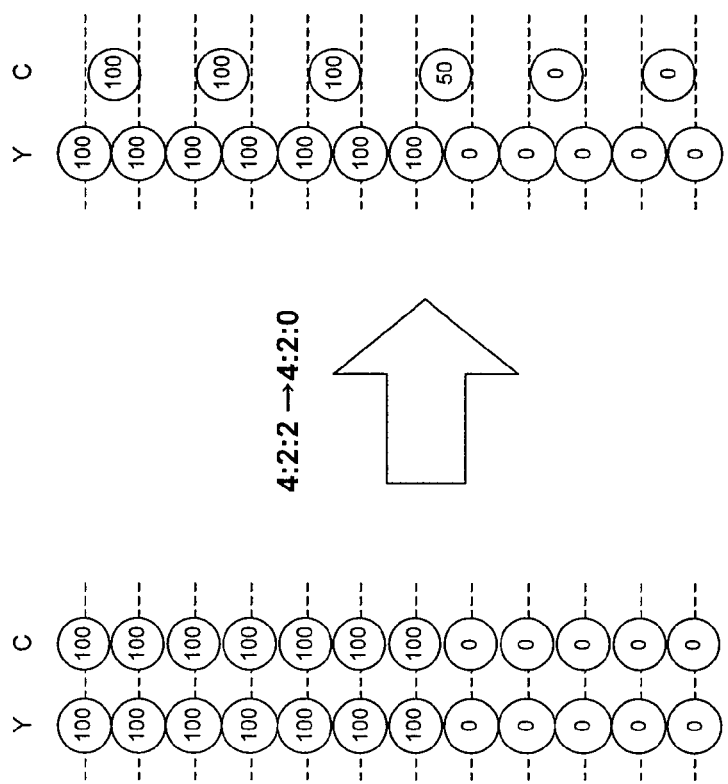

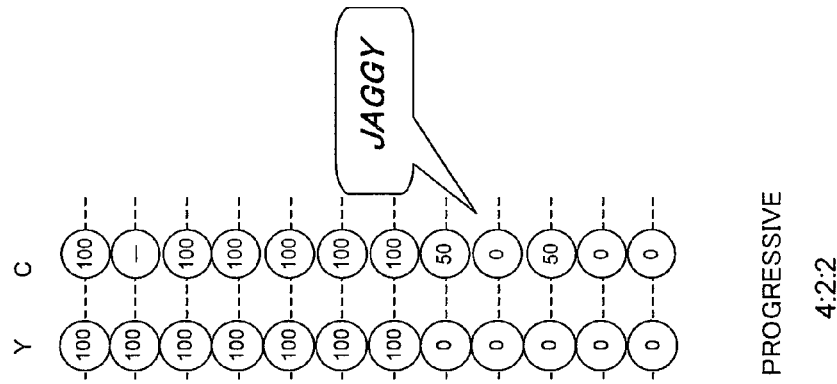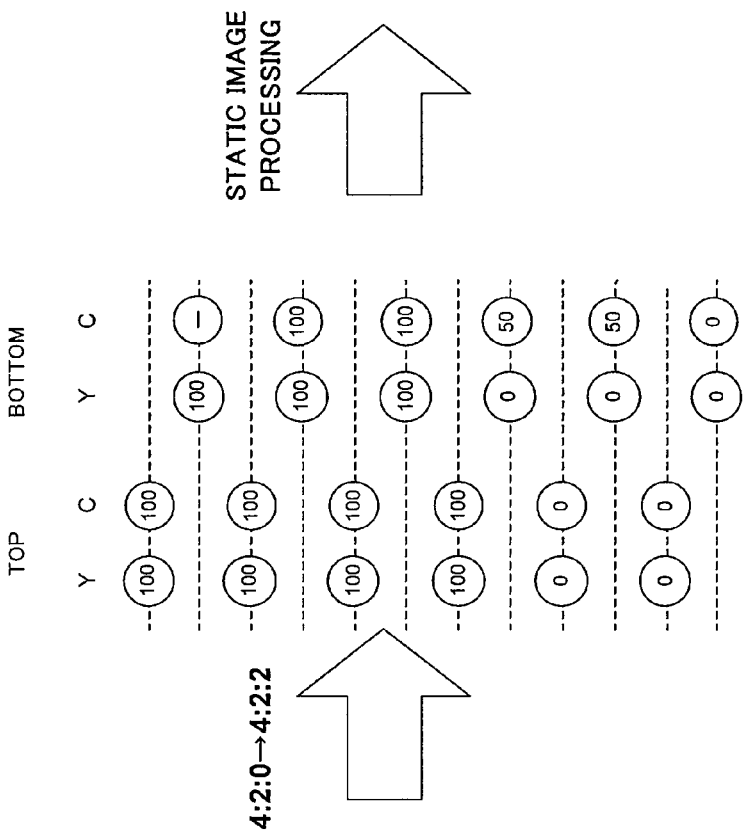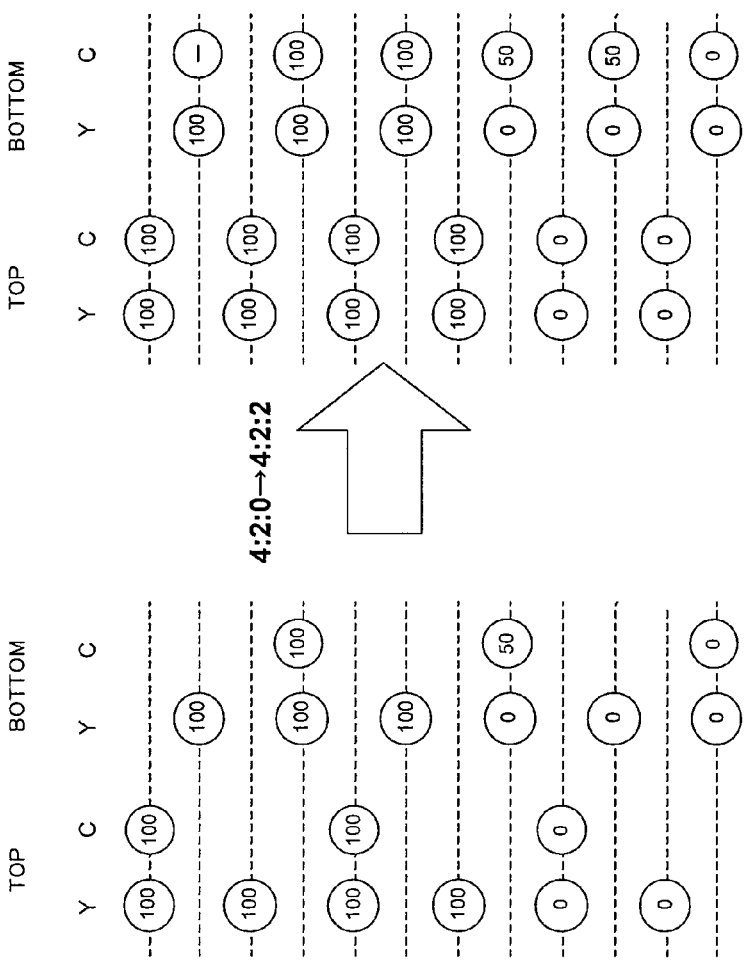

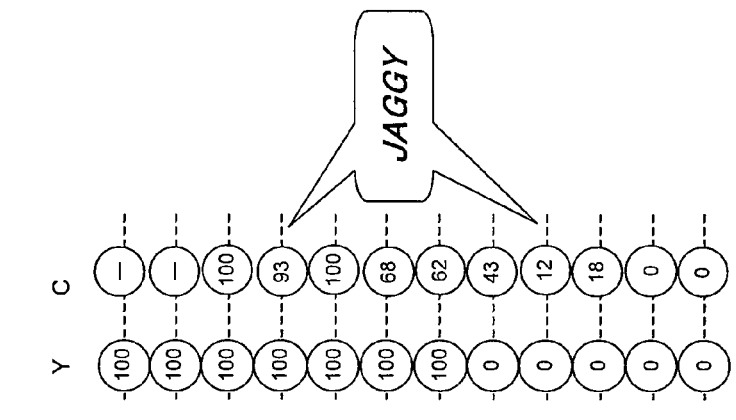
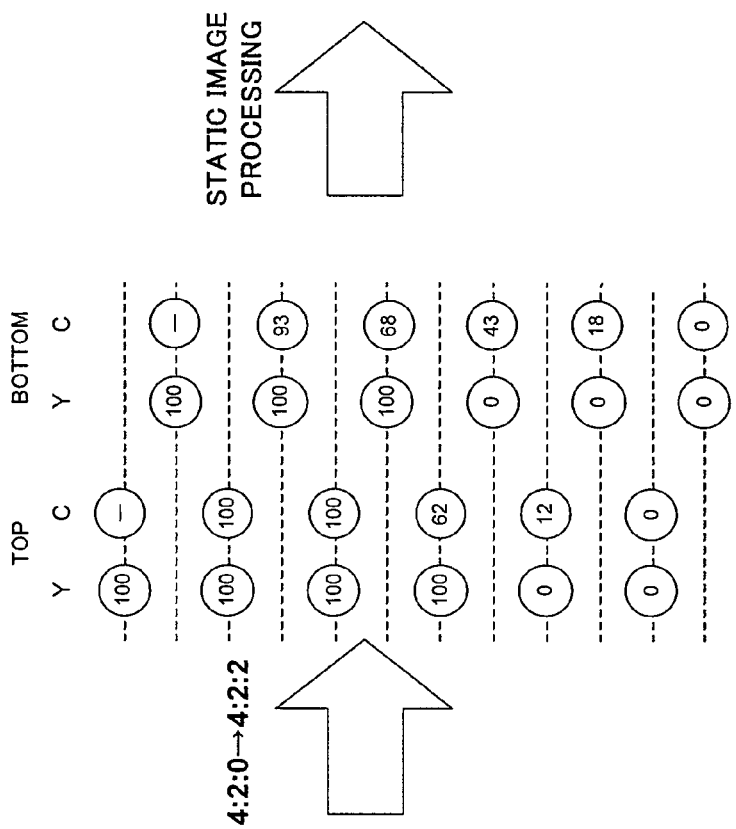
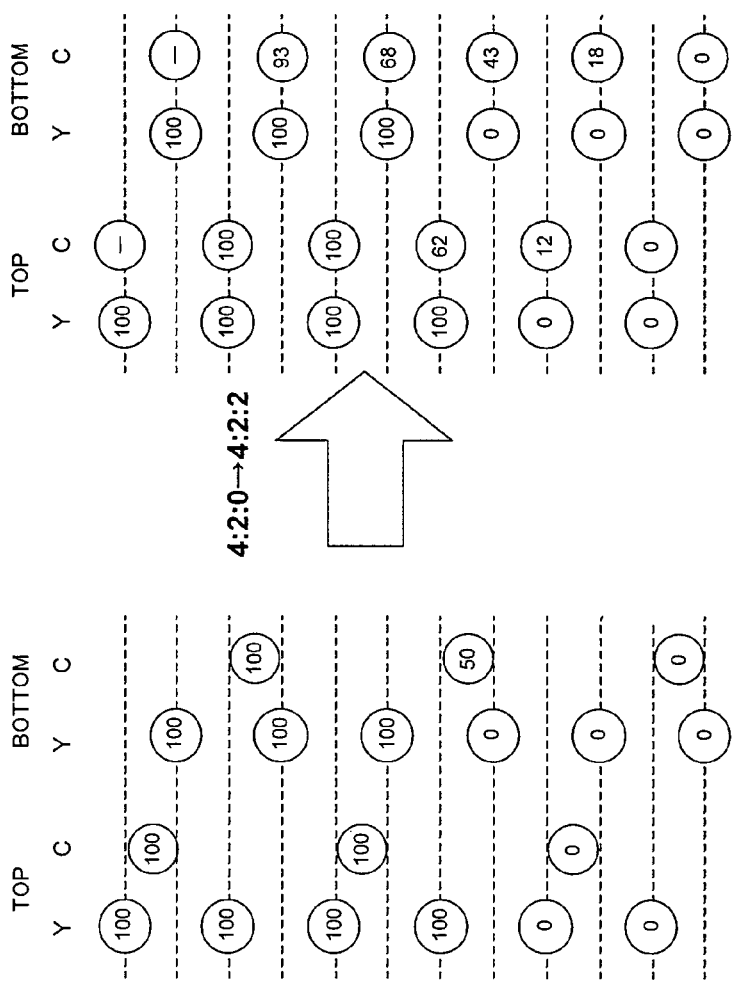

US 8,164,687 B2

COLOR DIFFERENCE SIGNAL IP CONVERSION METHOD

RELATED APPLICATIONS

This application is the U.S. National Phase under 35 U.S.C. §371 of International Application No. PCT/JP2007/062697, filed on Jun. 25, 2007, which in turn claims the benefit of Japanese Application No. 2006-260217, filed on Sep. 26, 2006, the disclosures of which Applications are incorporated by reference herein.

TECHNICAL FIELD

The present invention relates to a method for converting (IP converting) an image interlaced signal into a progressive signal, and more particularly, it relates to generation of a static image signal of a color-difference signal performed in motion adaptive IP conversion.

BACKGROUND ART

An image signal typically used in the systems such as NTSC, PAL, SECAM, hi-vision (1080i or the like) employs an interlace method in which alternate scanning lines are decimated to be transferred for forming an image of one frame with two fields, and when such an image signal is displayed on a display device employing a progressive scanning method such as a liquid crystal display or a PDP, it is always necessary to perform IP conversion.

In general IP conversion, the motion in every pixel is obtained from an image signal, so that static image processing and dynamic image processing are switched or mixed in accordance with the detected motion, and thus, a satisfactory result is obtained. This IP conversion is designated as motion adaptive IP conversion.

As a conventional example, a part of the motion adaptive IP conversion concerned with IP conversion of a color-difference signal is shown in a block diagram of FIG. 21. In FIG. 21, a color-difference signal IP converter 1 includes a color-difference static image processing unit 6 for generating a static image signal through field insert, a color-difference dynamic image processing unit 7 for generating an interpolated pixel from pixels included in a field, and a static/dynamic mixing unit 8 for mixing outputs of the color-difference static image processing unit 6 and the color-difference dynamic image processing unit 7 in accordance with motion detection information. A color-difference signal field delay is supplied to the color-difference static image processing unit 6, a color-difference signal current field is supplied to the color-difference static image processing unit 6 and the color-difference dynamic image processing unit 7, and a result of the IP conversion is output from the static/dynamic mixing unit 8.

With respect to a still picture (a static image), a picture of an initial one frame can be generated through insert of picture of two successive fields (inter-field insert). This conversion into a progressive signal through the insert is realized by the color-difference static image processing unit 6. Also, with respect to a moving picture (a dynamic image), it is necessary to perform interpolation (intra-field interpolation) based on pixels included in a field because a picture shifted in alternate lines is generated through simple insert. This processing is realized by the color-difference dynamic image processing unit 7. Since most of image signals include a still portion and a moving portion in one screen, the static/dynamic mixing unit 8 mixes conversion results so as to output an ultimate IP conversion result of a color-difference signal on the basis of detected motion in every pixel.

Recently, digitalization of image signals has been developed, and in particular, digital broadcasting, DVDs and the like employing image compaction technique typified by MPEG have been remarkably spread. In the compaction of image signals employing the MPEG, the fact that a human visual characteristic is less sensitive to a color-difference signal than a luminance signal is utilized, and a process for decimating the number of lines of a color-difference signal to a half of the number of lines of a luminance signal is performed. This operation will be described with reference to FIGS. 22A through 22C.

FIGS. 22A through 22C show an operation for converting a progressive signal into an interlaced signal in employing MPEG2, in which Y indicates a luminance signal and C indicates a color-difference signal. Color-difference signals are actually classified into two kinds, namely, R-Y signals and B-Y signals, but are commonly described as the color-difference signal C in the following description because these two kinds of signals are similarly processed. FIGS. 22A through 22C show relationships among pixels obtained in converting a progressive signal into an interlaced MPEG2 signal, and the vertical direction of the drawings corresponds to the vertical direction of a picture on the screen.

FIG. 22A shows the arrangement of pixels in a state of a progressive signal, and in employing, for example, the NTSC system, the number of effective lines is 480, which means that there are 480 pixels arranged along the vertical direction of FIG. 22A. As shown in FIG. 22A, the pixels are present in the same number of lines in the signal Y and the signal C in the progressive state. Each numerical value shown in the drawing indicates the level of the corresponding pixel, and a state where the level is changed from 100 to 0 in the downward direction is shown both in the signals Y and C. This state is designated as "progressive 4:2:2". Although the number of lines of an R-Y signal and a B-Y signal is actually decimated to a half also along the horizontal direction in 4:2:2, the description is herein given with respect to the line direction alone.

FIG. 22B shows a state where one of two lines of color-difference signal is decimated in the progressive 4:2:2 of FIG. 22A, and this state is designated as "progressive 4:2:0". In order to prevent frequency folding derived from the decimation, a vertical LPF is provided so that the center of gravity of the pixels can fall in the middle of the signal Y. In FIG. 22B, the simplest LPF for obtaining an average of 2 taps is provided.

FIG. 22C shows a state obtained by converting the state of FIG. 22B into an interlaced signal. An interlaced signal is regarded as a signal in which alternate lines of progressive signal are decimated to be decomposed into two fields, and a field starting from a top line is designated as a top field and a field starting from a bottom line is designated as a bottom field. Although the bandwidth is limited also in interlacing, both the signals Y and C are simply decimated to be halved in FIG. 22C for making the operation easily understood.

As the form of an image signal, a state where the number of lines of a color-difference signal is the same as the number of lines of a luminance signal is designated as 4:2:2, and a state where the number of lines of a color-difference signal is a half of the number of lines of a luminance signal is designated as 4:2:0.

In the digital broadcasting or a recording medium such as a DVD or an HD recorder employing the MPEG compaction, a color-difference signal is in the 4:2:0 state.

On the other hand, in an output of digital image equipment, the number of lines of a luminance signal and that of a color-difference signal are defined to be the same, and therefore, a process for converting the 4:2:0 into the 4:2:2 is performed after MPEG decode in a digital broadcasting decoder or an MPEG decoder included in a DVD, STB or HD recorder. Also, even within the digital image equipment or within a digital decoder integrated circuit, an output of a digital decoder may be dealt with in the 4:2:2 state.

Next, an example of the conversion from the 4:2:0 to the 4:2:2 and an example of static image processing performed in the IP conversion will be described.

FIGS. 23A through 23C show, as a method for converting the 4:2:0 to the 4:2:2, line doubler processing in which one line is output twice. Since this processing is easily realized, a DVD player or the like for decoding/outputting by this processing is available as an actual product. FIG. 23A shows an MPEG2 stored state of interlaced 4:2:0, and in FIG. 23B, the 4:2:2 state is realized by restoring the number of lines by repeating one pixel through the line doubler of a color-difference signal. FIG. 23C shows a signal obtained through the IP conversion of the 4:2:2 interlaced signal of FIG. 23B through the static image processing by the field insert. Although a luminance signal Y in which the lines have not been decimated to a half is completely restored, to-and-fro of the level is caused at a level change point in a color-difference signal C. This appears as jaggy in a picture, and a picture having vertical burr causing a sense of incompatibility is generated.

FIGS. 24A through 24C show, as another method for converting the 4:2:0 to the 4:2:2, processing for interpolation generating decimated lines based on pixels of upper and lower lines within a field. In FIG. 24A, an MPEG2 stored state of an interlaced 4:2:0 signal is shown with the center of gravity of pixels considered, and in FIG. 24B, pixels decimated in the 4:2:0 state are interpolation generated on the basis of the center of gravity of one upper and one lower pixels as the simplest example so as to be converted into the 4:2:2. FIG. 24C shows a signal obtained through the IP conversion of the 4:2:2 interlaced signal of FIG. 24B through the static image processing by the field insert. Also in this example, the to-and-fro of the level is caused at a level change point in a color-difference signal although the extent is lower than in the line doubler method.

In either of the above-described examples, the decimated lines are restored within the field in the interlaced 4:2:0 state so as to generate the 4:2:2, and hence, the interpolation is performed without considering the relationship between interlaced fields. Therefore, there arises a problem when the inter-field interpolation is performed thereafter.

As another method of the conventional IP conversion, the inter-field insert is performed not in the 4:2:2 but in 4:2:0 obtained by decimating lines of the 4:2:2 again (see, for example, Patent Document 1).

As still another method, in the case where a color-difference signal is 4:2:0 obtained by the line doubler, the inter-field insert is performed on new 4:2:2 generated by interpolating pixels having been interpolated through the line doubler again based on upper and lower pixels (see, for example, Patent Document 2).

Patent Document 1: International Publication Pamphlet No. 02/052849

Patent Document 2: Japanese Laid-Open Patent Publication No. 2006-121568

DISCLOSURE OF THE INVENTION

Problems to be Solved by the Invention

In the conventional technique, through the inter-field insert performed in the 4:2:0 state described in Patent Document 1, a satisfactory result can be obtained in a 4:2:2 color-difference signal obtained by decoding a 4:2:0 color-difference signal of the MPEG compaction or the like. On the contrary, the vertical frequency characteristic of a color-difference signal is halved when the color-difference signal is a correct 4:2:2 signal obtained through, for example, A/D conversion of an analog broadcasting signal. Also, as described in Patent Document 2, when the line doubler is changed for intra-field interpolation, a better result than in the line doubler is obtained, but jaggy cannot be completed avoided as described with reference to FIGS. 24A through 24C.

In consideration of these conventional problems, an object of the invention is providing a color-difference signal IP conversion method in which jaggy is reduced and degradation of the initial frequency characteristic of a correct 4:2:2 signal is suppressed in accordance with the origin of an input color-difference signal.

Means for Solving the Problems

In order to solve the problems, according to the first invention, the color-difference signal IP conversion method employed for motion adaptive interlace/progressive (IP) conversion, includes a step of performing static image pixel interpolation of a color-difference signal by selecting or mixing, appropriately for reducing jaggy in an output color-difference signal, a result of first static image processing in which a progressive signal is generated by inserting pixels of successive two fields and a result of second static image processing in which a progressive signal is generated by inserting pixels between data of successive two fields having been decimated in lines and line interpolation is performed on the generated progressive signal correspondingly to decimated lines.

Also, according to the second invention, the color-difference signal IP conversion method employed for motion adaptive interlace/progressive (IP) conversion, includes a step of generating a progressive signal by inserting pixels of successive two fields and performing static image pixel interpolation of a color-difference signal by using, as a static image interpolating signal, a signal obtained by subjecting the progressive signal to a vertical post-processing filter.

Furthermore, according to the third invention, the color-difference signal IP conversion method employed for motion adaptive interlace/progressive (IP) conversion, includes a step of performing static image pixel interpolation of a color-difference signal by selecting or mixing, appropriately for reducing jaggy in an output color-difference signal, a result of first static image processing in which a progressive signal is generated by inserting pixels of successive two fields and a result of second static image processing in which the progressive signal is subjected to a vertical post-processing filter.

In the color-difference signal IP conversion method of the second or third invention, the post-processing filter preferably outputs a median on the basis of a noted pixel and upper and lower pixels of the noted pixel.

Effect of the Invention

According to the first invention, a static image generation method for a color-difference signal is appropriately switched, so as to realize a color-difference signal IP conversion method in which jaggy is reduced and degradation of vertical bandwidth is suppressed.

According to the second invention, it is possible to realize a color-difference signal IP conversion method in which jaggy is reduced by using a post-processing filter of a median filter when jaggy is caused and degradation of a frequency characteristic along a vertical direction is suppressed by using the median filter when jaggy is not caused.

According to the third invention, it is possible to realize a color-difference signal IP conversion method in which jaggy is reduced and degradation of a frequency characteristic along a vertical direction is suppressed by appropriately switching an output of conventional static image processing IP conversion and an output obtained by applying a post-processing median filter to the former output.

BRIEF DESCRIPTION OF DRAWINGS

FIGS. 17A and 17B are diagrams for showing a relationship between an input and an output of a vertical 3-tap median filter of FIG. 16.

FIGS. 18A and 18B are diagrams for showing another relationship between the input and the output of the vertical 3-tap median filter of FIG. 16.

FIGS. 22A, 22B and 22C are diagrams for showing the principle of conventional color-difference signal IP conversion from a progressive signal to an interlaced 4:2:0 signal.

FIGS. 23A, 23B and 23C are diagrams for showing a principle of occurrence of jaggy in the conventional color-difference signal IP conversion.

FIGS. 24A, 24B and 24C are diagram for showing another principle of the occurrence of jaggy in the conventional color-difference signal IP conversion.

Figure 1:
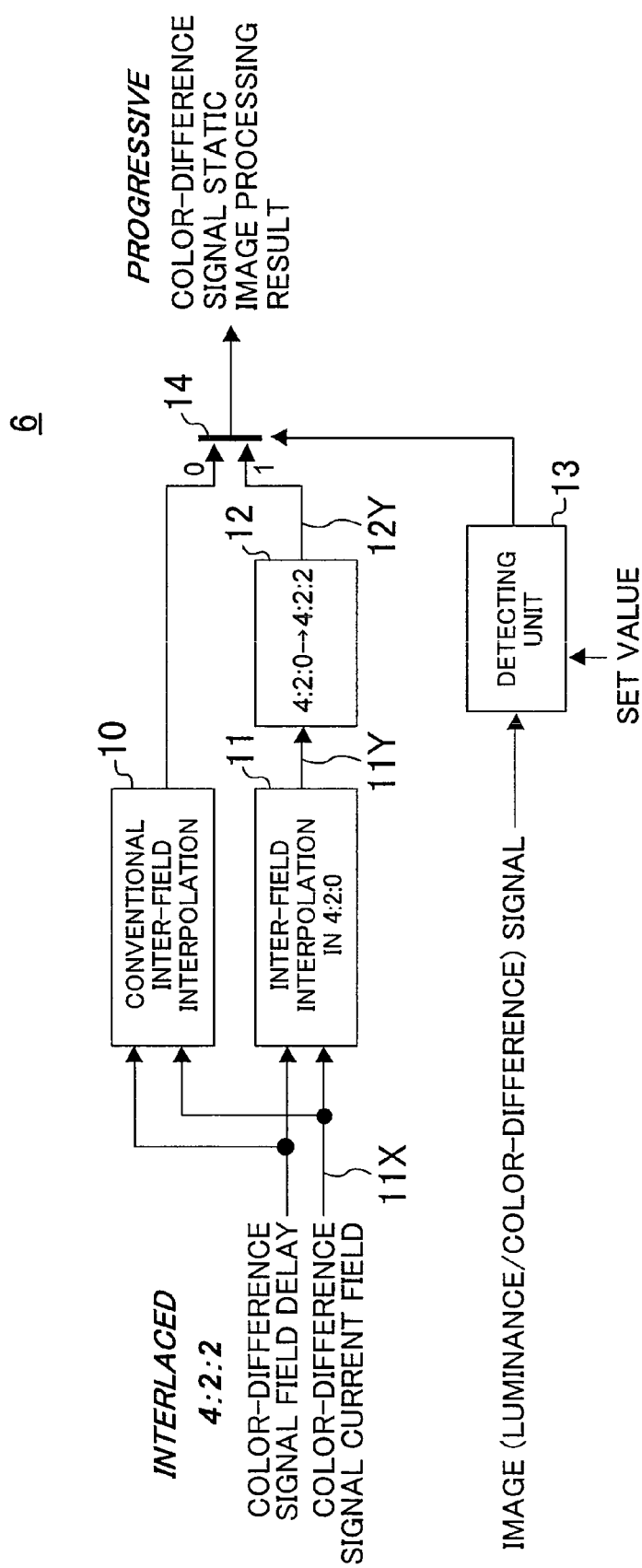
FIG. 1 is a block diagram of a color-difference signal IP conversion static image processing unit of this invention.

DESCRIPTION OF REFERENCE NUMERALS 1 motion adaptive color-difference signal IP converter
6 color-difference signal IP conversion static image processing unit
7 color-difference signal IP conversion dynamic image processing unit
8 static/dynamic mixing unit
10 conventional color-difference inter-field interpolating unit
11 color-difference 4:2:0 inter-field interpolating unit
12 color-difference intra-field line interpolating unit
13 detecting unit
14 color-difference static image processing method selecting/mixing unit
15 one-line delaying part
16 difference absolute value calculating part
17 comparing part
18 pattern analyzing part
20 vertical high pass filter
21 cumulative part
22 ID1 detecting part
23 digital image equipment set
24 analog digital converter
25 digital video decoder
26 control microcomputer
27 format converting unit
28 vertical 3-tap median filter
31, 32 level comparing part
33 information decoding unit
34 selecting unit

BEST MODE FOR CARRYING OUT THE INVENTION

A best mode for carrying out the invention will now be described with reference to the accompanying drawings. Although color-difference signals are classified into two kinds of signals, that is, an R-Y signal and a B-Y signal, they are described commonly as a color-difference signal C in the following description because they are similarly processed.

FIG. 1 shows a color-difference signal IP conversion static image processing unit of this invention. In FIG. 1, a reference numeral 6 denotes the color-difference signal IP conversion static image processing unit, which corresponds to a portion shown with the reference numeral 6 in the conventional example of FIG. 21. A reference numeral 10 denotes an inter-field interpolating unit corresponding to a conventional static image processing unit for a color-difference signal, a reference numeral 11 denotes a color-difference 4:2:0 inter-field interpolating unit, a reference numeral 12 denotes a color-difference intra-field line interpolating unit, a reference numeral 13 denotes a detecting unit for detecting a characteristic of an image signal, and a reference numeral 14 denotes a color-difference static image processing method selecting/mixing unit for selecting/mixing outputs of the interpolating units 10 and 12 in accordance with a result obtained by the detecting unit 13. Also, 11X and 11Y respectively denote an input and an output of the color-difference 4:2:0 inter-field interpolating unit 11, and 12Y denotes an output of the color-difference intra-field line interpolating unit 12.

An interlaced signal input to the color-difference signal IP conversion static image processing unit 6 is a 4:2:2 color-difference signal. The 4:2:2 color-difference signal may be one of the following two types of signals:

(A) An original 4:2:2 color-difference signal obtained through, for example, A/D conversion of analog broadcasting; and (B) a 4:2:2 color-difference signal obtained by interpolating a 4:2:0 signal of digital broadcasting, MPEG data or the like.

In the conventional inter-field interpolating unit 10, an interlaced color-difference signal of two successive fields is input, and an original progressive signal is generated through inter-field insert into one line. In the case where an input interlaced signal is a signal of the type (A), the original progressive signal can be completely reproduced, but in the case where the input signal is a signal of the type (B), the jaggy shown in FIG. 23C or 24C described with respective to the background art is caused.

Figure 2:
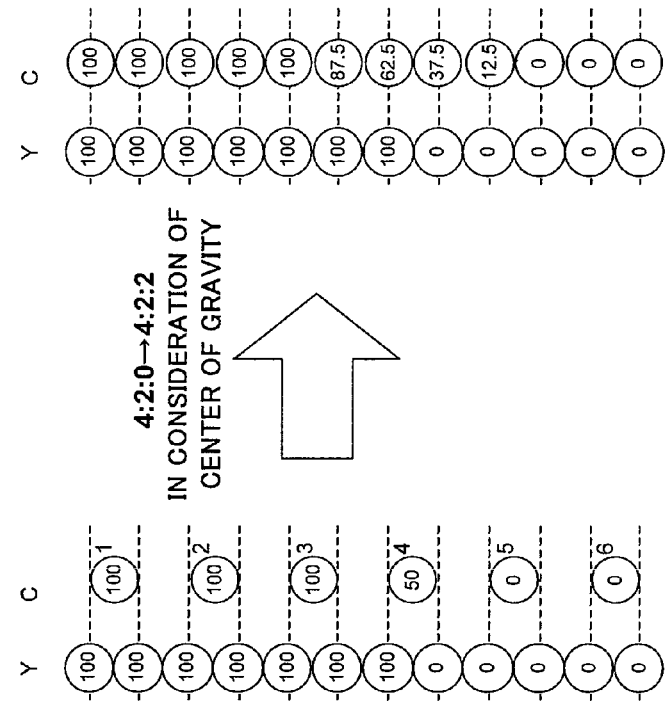
FIGS. 2A, 2B and 2C are diagrams for showing an operation of jaggy-reduced color-difference signal IP conversion static image processing of this invention.

Next, the color-difference 4:2:0 inter-field interpolating unit 11 will be described with reference to FIGS. 2A through 2C. FIG. 2A shows an interlaced signal 11X input to the color-difference 4:2:0 inter-field interpolating unit 11. At this point, interpolation of a signal of the type (B), and specifically, the interpolation of a 4:2:0 signal obtained by interpolating a 4:2:2 signal through line doubler will be described. FIG. 2A shows the same state as that shown in FIG. 23B. An input shown in FIG. 2A is a 4:2:2 color-difference signal, and the color-difference 4:2:0 inter-field interpolating unit 11 executes processing with this signal regarded as a 4:2:0 color-difference signal. Specifically, it is regarded that pixels marked with x in FIG. 2A are not present, and the inter-field insert is performed with the number of lines halved, so as to obtain a 4:2:0 progressive signal. This state corresponds to a signal 11Y shown in FIG. 2B. A numerical value shown in an upper right portion of each pixel in FIG. 2A corresponds to a numerical value shown in an upper right portion in the color-difference signal of FIG. 2B. Since the inter-field insert is performed with the number of lines halved from the original number, the number of lines of the color-difference signal of FIG. 2B is a half of that of a luminance signal. Furthermore, FIG. 2B shows the color-difference signal among a luminance signal in consideration of the center of gravity of pixels of the original color-difference signal (see FIG. 22B). Next, in order to make the number of lines accord with that of the luminance signal, the color-difference intra-field line interpolating unit 12 vertically interpolates decimated lines in the 4:2:0 progressive state, so as to obtain a signal 12Y of FIG. 2C as a result. Herein, an example of two-tap linear interpolation in which the number of lines is interpolated as well as the center of gravity is made to accord with that of the luminance signal is shown. As is understood from FIG. 2C, since the color-difference 4:2:0 inter-field interpolating unit 11 is used for performing the inter-field insert on the 4:2:0 color-difference signal with error interpolation information discarded from the 4:2:2 signal, a color-difference signal IP conversion static image with no jaggy can be obtained. However, since the number of lines is halved by the color-difference 4:2:0 inter-field interpolating unit 11, with respect to a correct 4:2:2 color-difference signal of the type (A), a side effect that the vertical bandwidth is degraded is caused.

Specifically, with respect to a correct 4:2:2 color-difference signal of the type (A), an output of the conventional inter-field interpolating unit 10 is selected, and with respect to a 4:2:2 color-difference signal interpolated in error of the type (B), an output obtained through signal processing of the two interpolating units 11 and 12 is selected, so that color-difference signal IP conversion static image processing free from jaggy can be realized without causing the side effect. This selection is performed by the color-difference static image processing method selecting/mixing unit 14 shown in FIG. 1 and the detecting unit 13 that generates a logic for the selecting/mixing unit 14. Now, examples of the detecting unit 13 will be described.

Figure 3:
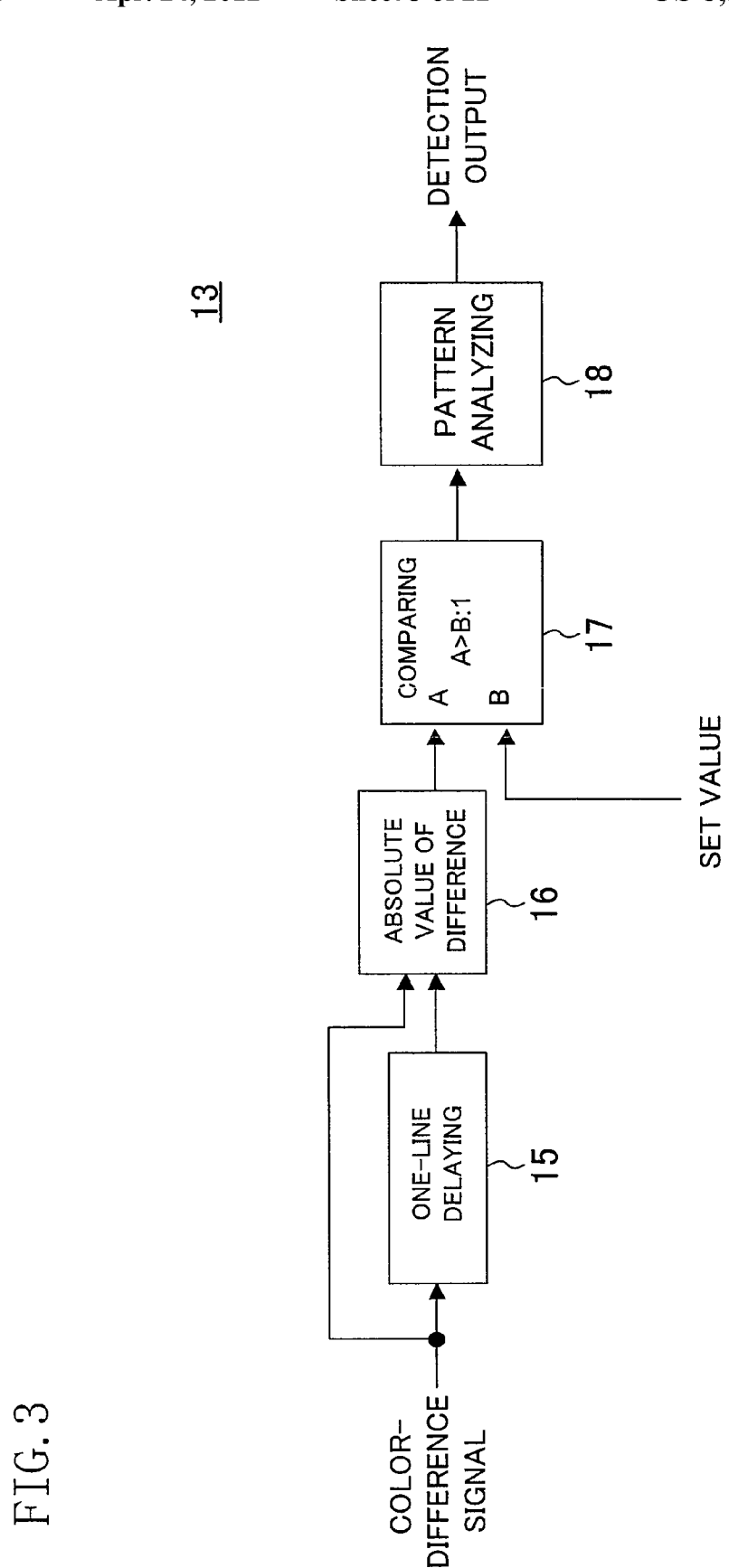
FIG. 3 is a block diagram of an example of a detecting unit of FIG. 1.

FIG. 3 shows an example of the detecting unit 13 of FIG. 1. In FIG. 3, a reference numeral 15 denotes a one-line delaying part for delaying a color-difference signal correspondingly to one line, a reference numeral 16 denotes a difference absolute value part for calculating an absolute value of a difference in an input signal, a reference numeral 17 denotes a comparing part for outputting whether or not an input is larger than a set value, and a reference numeral 18 denotes a pattern analyzing part. A current field of a color-difference signal is input to the detecting unit 13 of FIG. 3, so as to detect whether or not the color-difference signal is a 4:2:2 color-difference signal obtained through the interpolation with the line doubler. The absolute value of a difference between a color-difference signal delayed by the one-line delaying part 15 and the initial color-difference signal is calculated by the difference absolute value part 16. In other words, a difference in the color-difference level between successive lines is obtained. The thus obtained difference is compared with the set value by the comparing part 17, and "1" is output when the difference is larger and "0" is output when the difference is smaller.

Figures 4, 6:
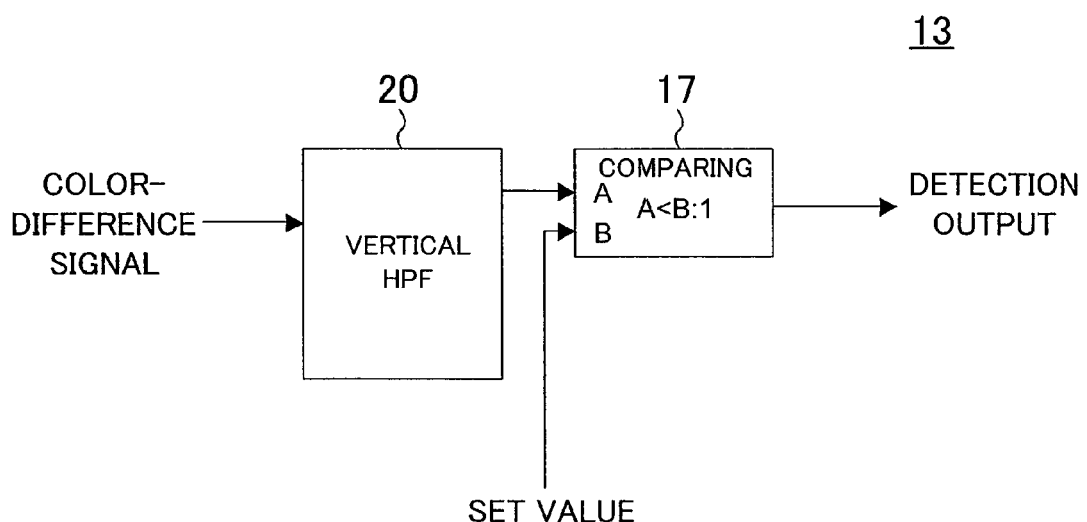
FIG. 4 is a diagram for showing a result of line doubler detection performed by a comparing part of FIG. 3.
FIG. 6 is a block diagram of still another example of the detecting unit of FIG. 1.

If the color-difference signal is obtained through the line doubler, the result obtained by the comparing part 17 may be as shown in FIG. 4, namely, the difference is 0 in alternate lines. Accordingly, in the case where it is determined by the pattern analyzing part 18 that the difference is 0 in alternate lines, it is determined that the input signal is a 4:2:2 color-difference signal obtained through the line doubler, and hence, "1" is output as the detection result. As a result, an IP conversion static image processing result with no jaggy is output from the color-difference signal IP conversion static image processing unit 6 of FIG. 1. Although a difference is 0 when the signal is obtained through complete line doubler, it may not be always 0 due to an analog error or an error in calculation performed during the processing, and therefore, the set value is used for providing likelihood in the detection of the line doubler. In this manner, in the example shown in FIG. 3, in the case where an interlaced color-difference signal is a 4:2:2 signal obtained by interpolating a 4:2:0 signal through the line doubler, a color-difference signal IP conversion method in which jaggy is definitely reduced can be realized.

Figure 5:
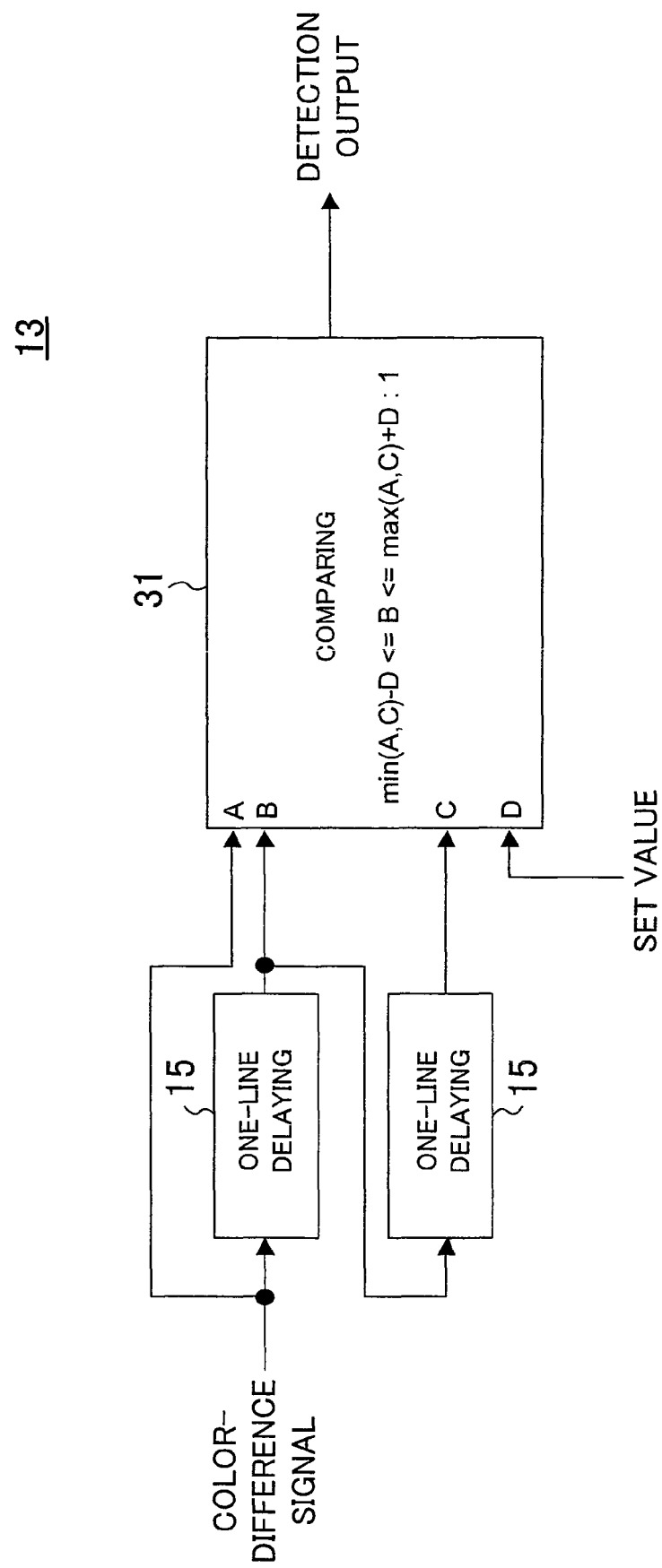
FIG. 5 is a block diagram of another example of the detecting unit of FIG. 1.

FIG. 5 shows still another example of the detecting unit 13 of FIG. 1. In FIG. 5, a reference numeral 15 denotes a one-line delaying part for delaying a color-difference signal correspondingly to one line and a reference numeral 31 denotes a level comparing part. A current field of a color-difference signal is input to the detecting unit 13 of FIG. 5, so as to determine whether or not the level of a noted pixel of the color-difference signal is between the levels of upper and lower pixels. A color-difference signal corresponding to successive three lines can be obtained by the serially connected one-line delaying parts 15. With a noted line included as the center of the successive three lines, the level comparing part 31 obtains the relationships in the level between the noted pixel and a pixel disposed on the noted pixel and between the noted pixel and a pixel disposed beneath the noted pixel. In the example of FIG. 5, "1" is output when the level of the noted pixel falls in a range from (the lower level of the upper and lower pixels)−(a set value) to (the higher level of the upper and lower pixels)+(the set value). In other words, a case where the level of the noted pixel is between the levels of the upper and lower lines can be detected. Also in this case, the set value can be set with likelihood in consideration of an error. A correct 4:2:2 signal sometimes has a large bandwidth of a color-difference signal and hence the level of a noted pixel is not always between the levels of upper and lower lines. On the other hand, with respect to a 4:2:2 signal obtained through the intra-field interpolation of a 4:2:0 interlaced color-difference signal, the level of a noted pixel is between the levels of upper and lower pixels although it cannot be detected through the line doubler. Therefore, such a signal can be detected in the structure of FIG. 5. As a result, the color signal IP conversion static image processing unit 6 of FIG. 1 outputs an IP conversion static image processing result free from jaggy. Although the same set value is set for the level comparing part 31 with respect to a luminance signal and a color-difference signal, different set values may be used. In this manner, in the example of FIG. 5, in the case where a color-difference signal in an interlaced state is obtained by interpolating a 4:2:0 signal through the line doubler or within an interlaced field, a color-difference signal IP conversion method in which jaggy is definitely reduced can be realized.

FIG. 6 shows still another example of the detecting unit 13 of FIG. 1. In FIG. 6, a reference numeral 20 denotes a vertical high pass filter and a reference numeral 17 denotes a comparing part. A vertical high component of a current field input in FIG. 6 is detected by the high pass filter 20 to be compared with a set value by the comparing part 17, and when the vertical high component is smaller, "1" is output. In the case where a vertical high component of an input interlaced color-difference signal is smaller, the signal is regarded to be a 4:2:2 signal obtained by interpolating a 4:2:0 color-difference signal originally having no bandwidth, and in the case where the vertical high component is larger, the signal is regarded to be a 4:2:2 signal originally having a bandwidth. Therefore, the types (A) and (B) can be distinguished by the structure of FIG. 6. As a result, the color-difference signal IP conversion static image processing unit 6 of FIG. 1 outputs an IP conversion static image processing result free from jaggy with respect to a signal of the type (B) and outputs an IP conversion static image result with no bandwidth degradation obtained through the conventional inter-field insert with respect to a signal of the type (A).

Figure 7:
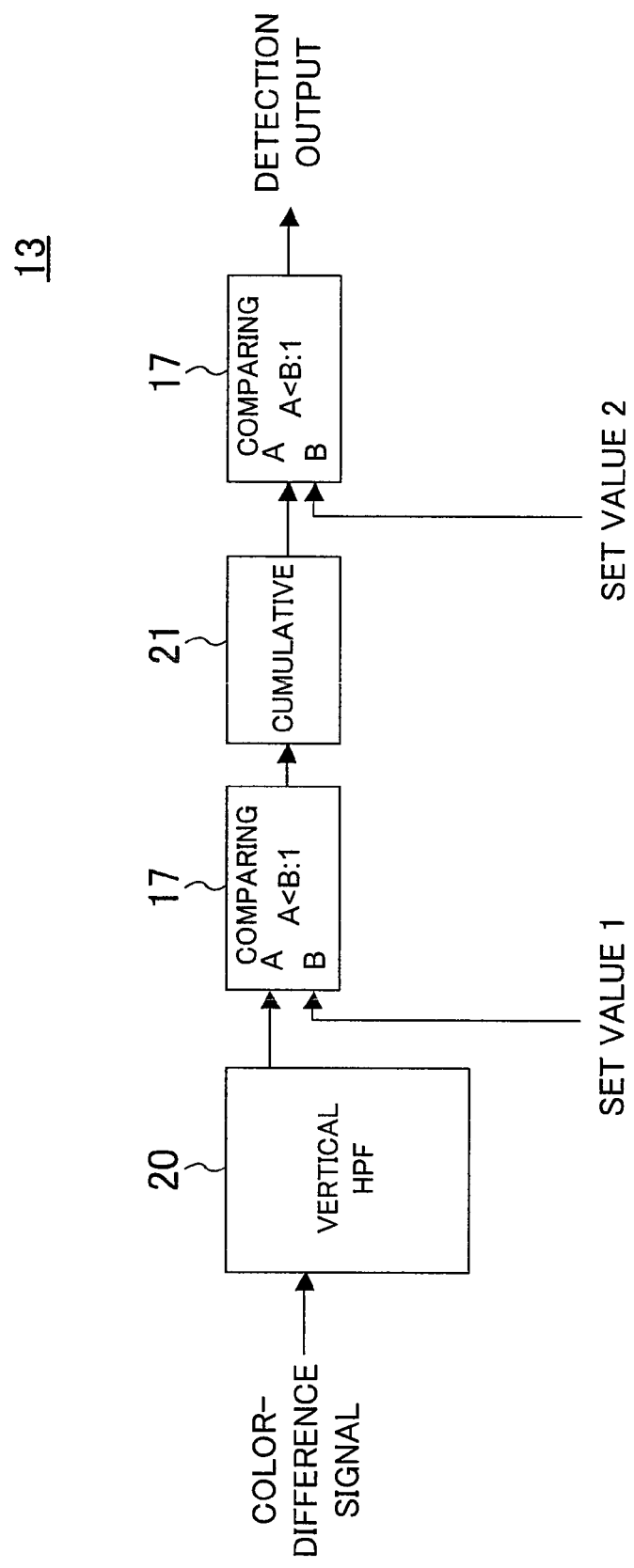
FIG. 7 is a block diagram of still another example of the detecting unit of FIG. 1.

FIG. 7 shows another example of the detecting unit 13 of FIG. 6, in which a cumulative part 21 and a comparing part 17 are additionally included. The cumulative part 21 is means for obtaining accumulation of pixels with a small vertical high component of, for example, one field period, and the comparing part 17 outputs whether the obtained result is larger or smaller than a set value. Specifically, the total amount of vertical high components of one screen can be obtained, and the types (A) and (B) can be distinguished with respect to each field. The distinction of the types (A) and (B) and the switching of the color-difference signal IP conversion static image processing unit 6 are executed in the same manner as in the example of FIG. 6. However, when the determination is made in each field, a next field is affected by the result of the determination, and therefore, a color-difference signal of one field previous to a current field is preferably input in the example of FIG. 7. In this manner, in the example of FIG. 7, the jaggy-reduced color-difference signal IP conversion method is selected merely when a vertical high component of a color-difference signal in an interlaced state is small. Therefore, it is possible to prevent the degradation in the vertical bandwidth caused by carelessly selecting the jaggy-reduced color-difference signal IP conversion method when a vertical high component is large.

Figure 8:
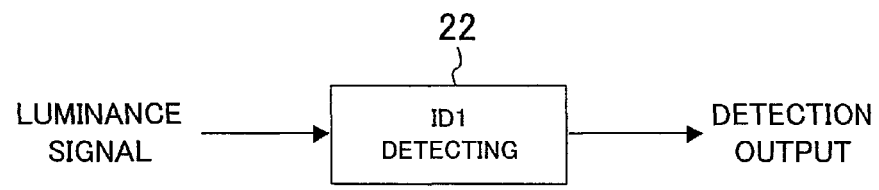
FIG. 8 is a block diagram of still another example of the detecting unit of FIG. 1.

FIG. 8 shows still another example of the detecting unit 13 of FIG. 1. In FIG. 8, a reference numeral 22 denotes an ID1 detecting part. An ID1 signal is a signal in which aspect ratio information or the like of an image signal is superimposed in a vertical blanking period of a luminance signal, and the information is detected by, for example, a receiver side so as to produce a display appropriately to the screen ratio of the receiver. This ID1 signal is superimposed on a digital image signal but not on a signal of the analog broadcasting and the like. In other words, when an ID1 signal is superimposed, the signal is highly possibly a 4:2:2 color-difference signal obtained by interpolating a 4:2:0 signal, and when it is not superimposed, the signal is highly possibly a correct 4:2:2 color-difference signal. Accordingly, a luminance signal is input, and when an ID1 signal is detected, the detecting part 13 outputs "1", so that the color-difference signal IP conversion static image processing unit 6 of FIG. 1 can output an IP conversion static image processing result free from jaggy. In this manner, in the example of FIG. 8, it can be determined on the basis of detection of an ID1 signal whether the signal is originally analog or digitally decoded. When it is digitally decoded, the color-difference signal is obtained by interpolating 4:2:0 into 4:2:2, and therefore, a color-difference signal IP conversion method in which jaggy is definitely reduced can be realized for a digitally decoded signal.

Figure 9:
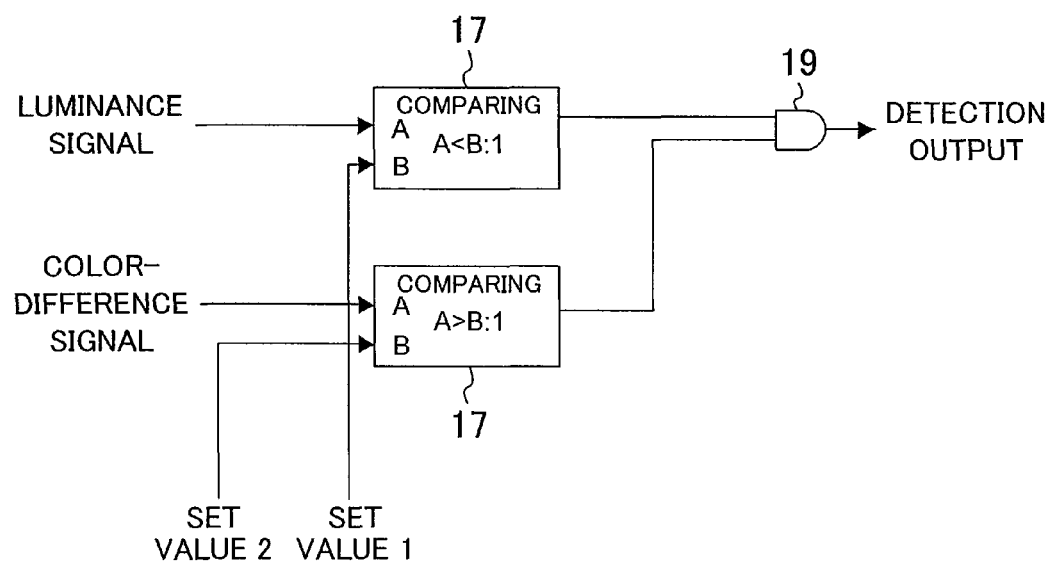
FIG. 9 is a block diagram of still another example of the detecting unit of FIG. 1.

FIG. 9 shows still another example of the detecting unit 13 of FIG. 1. In FIG. 9, a reference numeral 17 denotes a comparing part and a reference numeral 19 denotes a logic AND part. Color jaggy is conspicuous in a portion where the level of a color-difference signal is high and the level of a luminance signal is low. The example of FIG. 9 aims to detect a pixel in which the level of a color-difference signal is high and the level of a luminance signal is low. The levels of a luminance signal and a color-difference signal are compared with respective set values in different comparing parts 17. With respect to a luminance signal, "1" is output when a pixel has a level lower than the set value, and with respect to a color-difference signal, "1" is output when a pixel has a level higher than the set value, and the logic AND part 19 outputs "1" with respect to a pixel in which "1" is output with respect to both the signals. Merely with respect to a pixel in which the level of a color-difference signal is high and the level of a luminance signal is low, namely, merely with respect to a pixel where jaggy can be conspicuous, the color-difference signal IP conversion static image processing unit 6 of FIG. 1 outputs an IP conversion static image processing result free from jaggy. In this manner, in the example of FIG. 9, the jaggy-reduced color-difference signal IP conversion method is selected merely with respect to a pixel with low brightness and a large color-difference where jaggy is conspicuous, so that the conventional IP conversion method can be selected with respect to a pixel where jaggy is not conspicuous, and hence, the side effect can be suppressed. Also, in the example of FIG. 9, the color-difference static image processing method selecting/mixing unit 14 is operated to switch the method on the basis of a binary control signal supplied from the detecting unit 13 in the above description. Instead, a plurality of set values may be prepared for the comparing parts 17 for detecting the levels of a luminance signal and a color-difference signal in multiple stages, and states from one with a low luminance level and a high color-difference level to one with a high luminance level and a low color-difference level may be output in a plurality of stages on the basis of the detection results of the comparing parts 17 instead of the logic AND part 19. When such a logic is employed, the color-difference static image processing method selecting/mixing unit 14 of FIG. 1 can be switched so as to mix the static image processing units in a ratio in accordance with the level output from the detecting unit 13.

Figure 10:
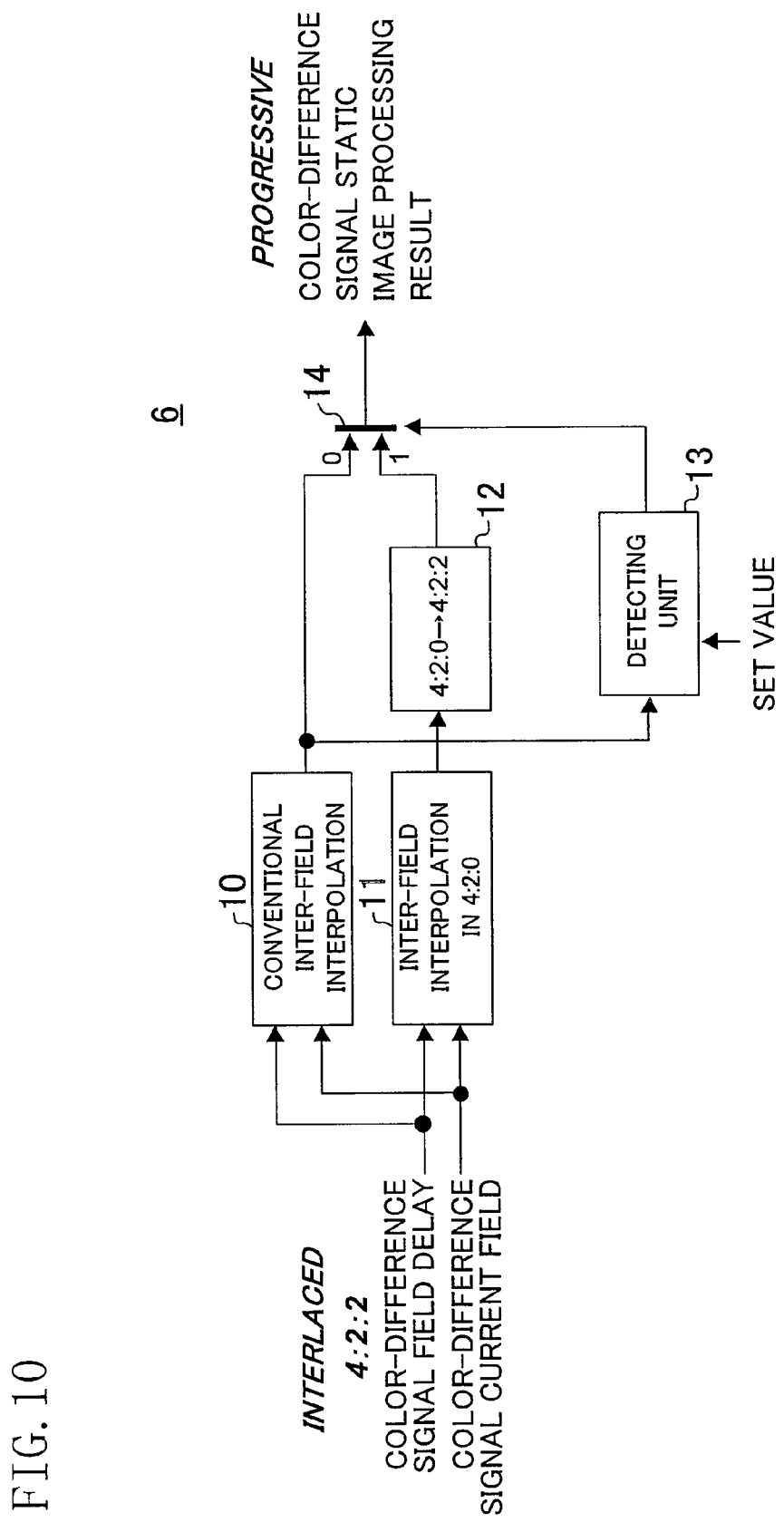
FIG. 10 is a block diagram of another example the color-difference signal IP conversion static image processing unit of this invention.

FIG. 10 shows another example of the color-difference signal IP conversion static image processing unit 6 of this invention. In FIG. 10, a reference numeral 6 denotes the color-difference signal IP conversion static image processing unit, which corresponds to the portion referred to with the reference numeral 6 in the conventional example shown in FIG. 21. A reference numeral 10 denotes an inter-field interpolating unit corresponding to a conventional static image processing unit for a color-difference signal, a reference numeral 11 denotes a color-difference 4:2:0 inter-field interpolating unit, a reference numeral 12 denotes a color-difference intra-field line interpolating unit, a reference numeral 13 denotes a detecting unit for detecting a characteristic of an image signal, and a reference numeral 14 denotes a color-difference static image processing method selecting/mixing unit for selecting/mixing outputs of the interpolating units 10 and 12 in accordance with a result obtained by the detecting unit 13. In this example, the operations of the respective units 10, 11, 12 and 14 are completely the same as those described with reference to FIG. 1 and hence the description is omitted. The one and only difference from the example of FIG. 1 is that the input of the detecting unit 13 is the output of the conventional color-difference inter-field interpolating unit 10. In other words, in the case where no jaggy is detected in a result of the conventional inter-field insert IP conversion, the output of the conventional color-difference inter-field interpolating unit 10 is output as the output of the color-difference signal IP conversion static image processing, and in the case where jaggy is detected, the output obtained through jaggy reduction by the interpolating units 11 and 12 is output as the output of the color-difference signal IP conversion static image processing, so that a color-difference signal static image processing output free from jaggy can be obtained. Now, examples of the detecting unit 13 for detecting presence of jaggy will be described.

Figure 11:
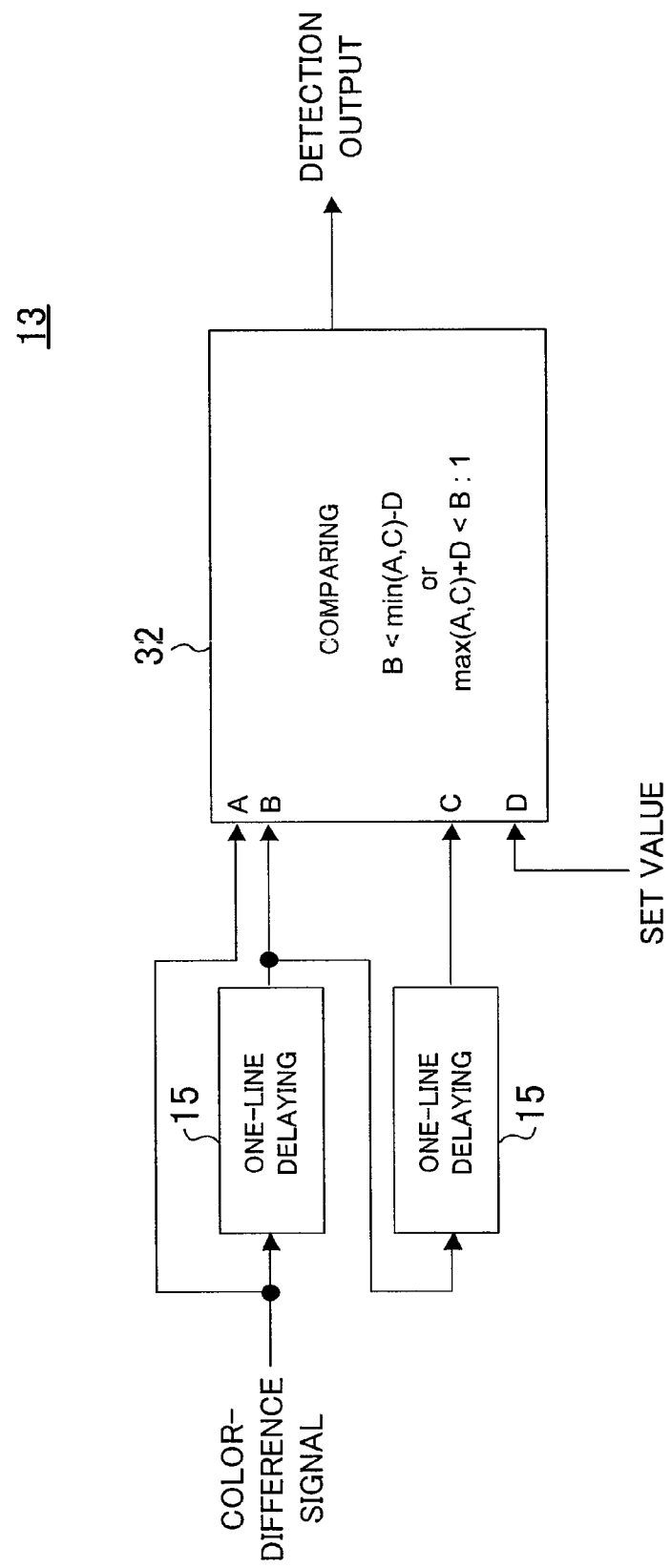
FIG. 11 is a block diagram of an example of a detecting unit of FIG. 10.

FIG. 11 shows an example of the detecting unit 13 of FIG. 10. In FIG. 11, a reference numeral 15 denotes a one-line delaying part and a reference numeral 32 denotes a level comparing part. A result obtained by the conventional color-difference inter-field interpolating unit 10 is input to the detecting unit 13 of FIG. 11, so as to detect whether or not the level of a noted pixel of a color-difference signal is between the levels of pixels disposed on and beneath the noted pixel. A color-difference signal corresponding to successive three lines can be obtained by the serially connected one-line delaying parts 15. With a noted line included as the center of the successive three lines, the level comparing part 32 obtains the relationships in the level between the noted pixel and the pixel disposed on the noted pixel and between the noted pixel and the pixel disposed beneath the noted pixel. In the example of FIG. 11, "1" is output when the level of the noted pixel is smaller than (the lower level of the upper and lower pixels)−(a set value) or when it is larger than (the higher level of the upper and lower pixels)+(the set value). In a general image signal, a color-difference signal is less likely changed abruptly along the line direction, and hence, in the case where the level of the noted pixel is farther from the level of the upper or lower pixel by the set value or more as detected in the detecting unit 13 of FIG. 11, it is regarded that jaggy is highly possibly caused. Therefore, the detecting unit 13 outputs "1" in such a case, so that an IP conversion static image processing result free from jaggy can be output from the color-difference signal IP conversion static image processing unit 6 of FIG. 10. In this manner, in the example of FIG. 11, when the result of the conventional inter-field insert color-difference signal IP conversion is out of the range between upper and lower color-difference signals or out of the range of (the range between the level values of the upper and lower pixels)+(a given value), it is regarded that jaggy is caused. Accordingly, the jaggy-reduced color-difference signal IP conversion method is employed in this case, so as to definitely reduce the jaggy.

Figure 12:
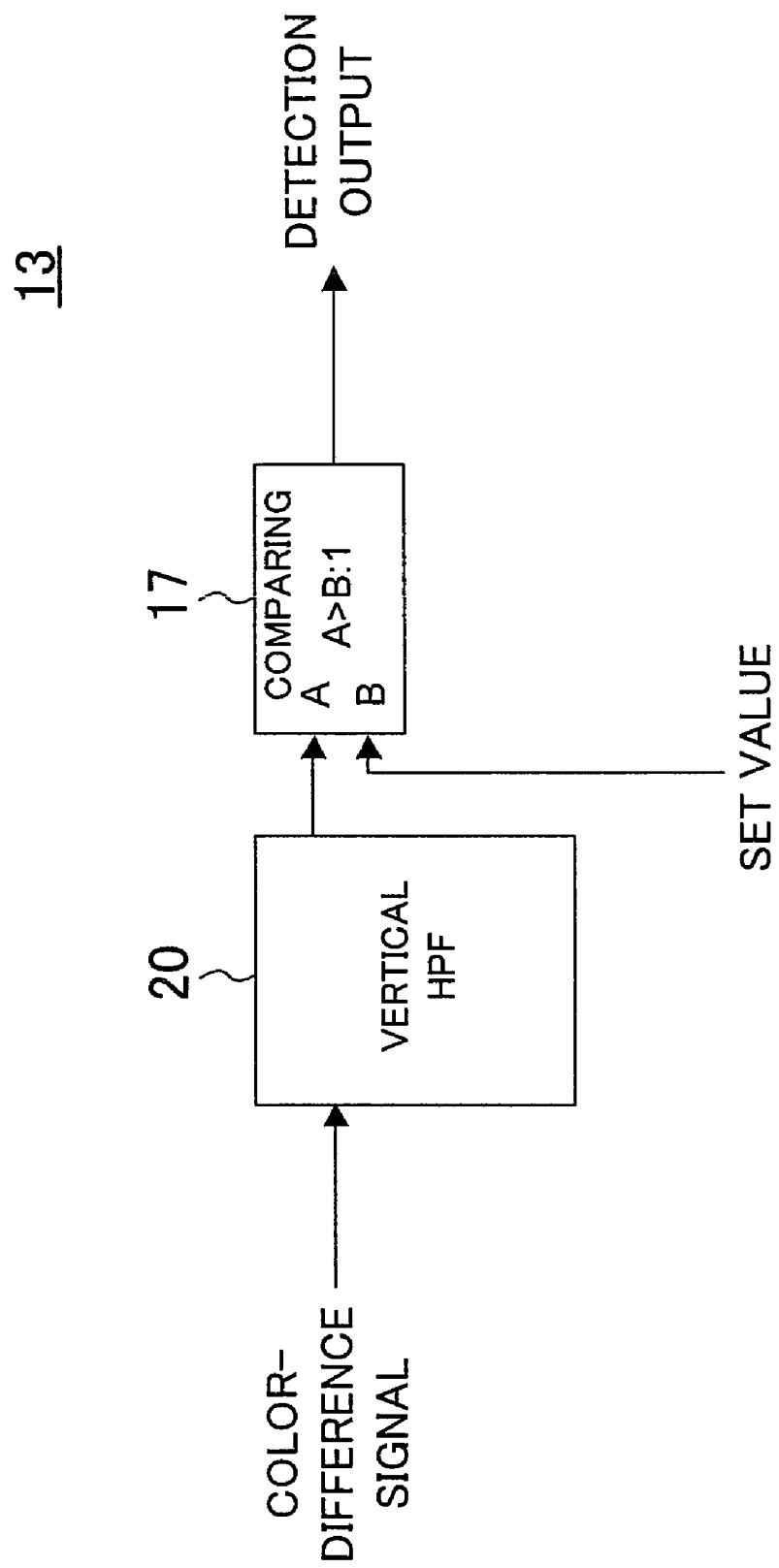
FIG. 12 is a block diagram of another example of the detecting unit of FIG. 10.
Figure 13:
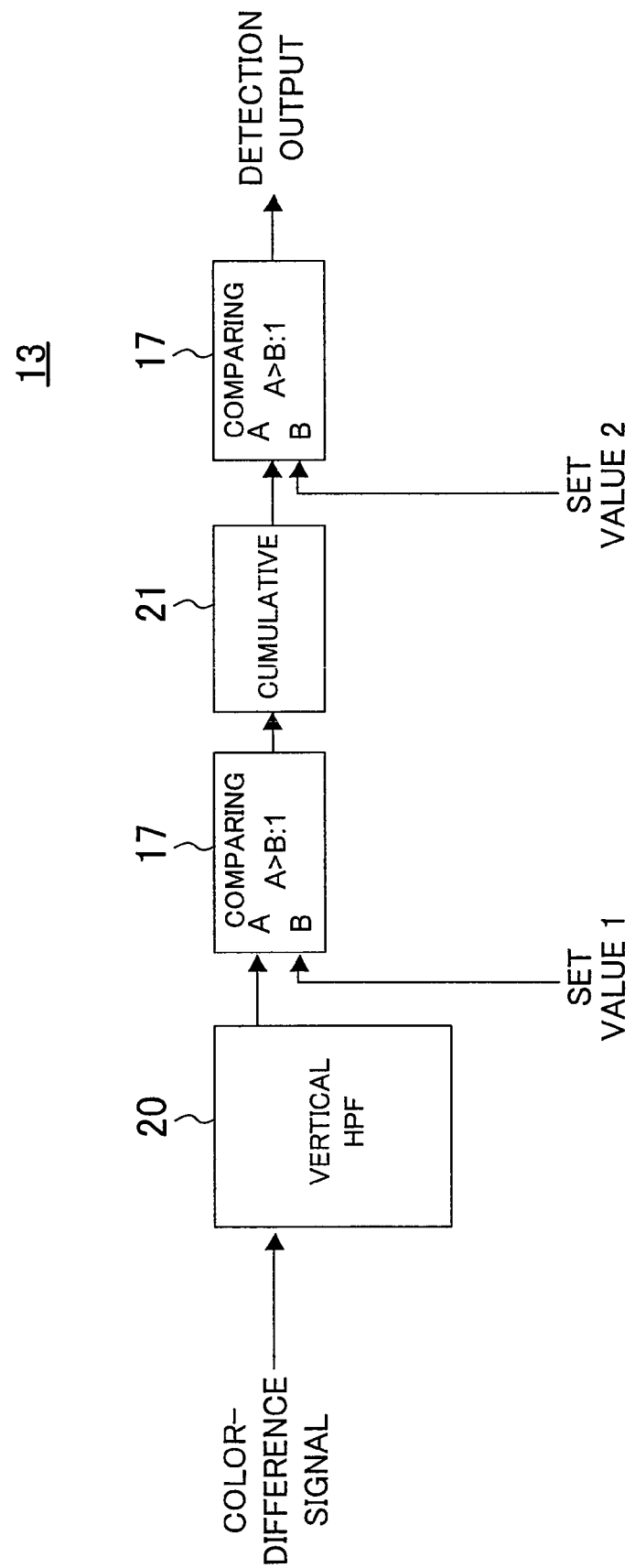
FIG. 13 is a block diagram of still another example of the detecting unit of FIG. 10.

FIGS. 12 and 13 show other examples of the detecting unit 13 of FIG. 10. In FIGS. 12 and 13, a reference numeral 20 denotes a vertical high pass filter and a reference numeral 17 denotes a comparing part. In FIG. 13, a reference numeral 21 denotes a cumulative part and a reference numeral 17 denotes a comparing part. The operations of the examples of FIGS. 12 and 13 are the same as those described with reference to FIGS. 6 and 7 above, but the logic of the comparing part 17 is reversed. Specifically, in the example of FIG. 12, "1" is output when a vertical high component of a result obtained by the conventional color-difference inter-field interpolating unit 10 is larger than a set value, and in the example of FIG. 13, "1" is output when a sum of vertical high components in one screen of a result obtained by the conventional color-difference inter-field interpolating unit 10 is larger than a set value. In a general image signal, a high component along a vertical direction of a color-difference signal is not very large, and hence, when a vertical high component is large, it is determined that jaggy is possibly included. Therefore, "1" is output from the detecting unit 13, so that an IP conversion static image processing result free from jaggy can be output from the color-difference signal IP conversion static image processing unit 6 of FIG. 10. In this manner, in each of the examples of FIGS. 12 and 13, it is determined that jaggy is caused when a vertical high component of a result of the conventional field insert color-difference signal IP conversion is larger than the given value. In this case, the jaggy-reduced color-difference signal IP conversion method is employed, so as to definitely reduce the jaggy.

Figure 14:
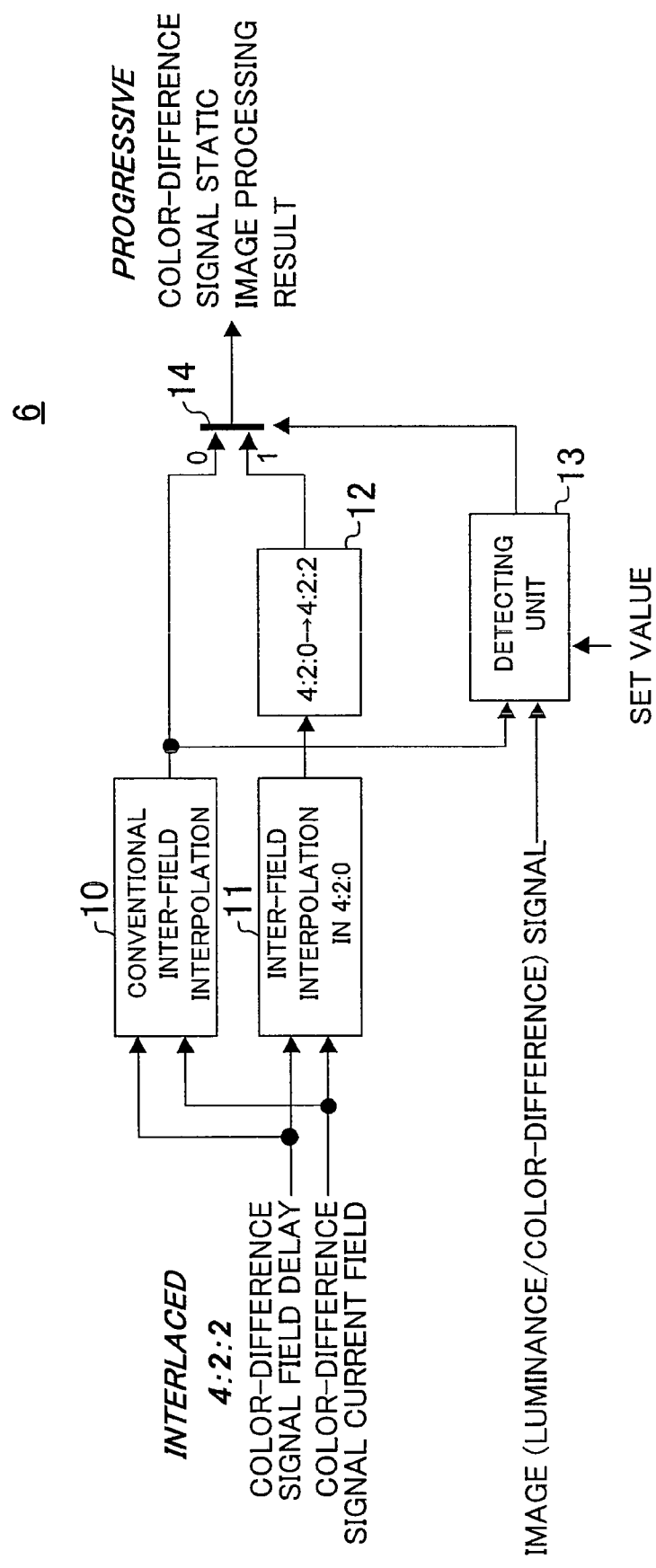
FIG. 14 is a block diagram of still another example of the color-difference signal IP conversion static image processing unit of this invention.

FIG. 14 shows another example of the color-difference signal IP conversion static image processing unit of this invention. In FIG. 14, a reference numeral 6 denotes the color-difference signal IP conversion static image processing unit, which corresponds to the portion referred to with the reference numeral 6 in the conventional example of FIG. 21. A reference numeral 10 denotes an inter-field interpolating unit corresponding to a conventional static image processing unit for a color-difference signal, a reference numeral 11 denotes a color-difference 4:2:0 inter-field interpolating unit, a reference numeral 12 denotes a color-difference intra-field line interpolating unit, a reference numeral 13 denotes a detecting unit for detecting a characteristic of an image signal, and a reference numeral 14 denotes a color-difference static image processing method selecting/mixing unit for selecting/mixing outputs of the interpolating units 10 and 12 in accordance with a result obtained by the detecting unit 13. In this example, the operations of the units 10, 11, 12 and 14 are completely the same as those described with reference to FIG. 1 and hence the description is omitted. In the example of FIG. 14, signals to be subjected to the detection by the detecting unit 10 are an image (luminance/color-difference) signal and an output of the conventional inter-field interpolating unit 10. In the aforementioned examples, the detecting unit 13 selects either the conventional inter-field interpolation or the jaggy-reduced color-difference signal IP conversion method in accordance with its own detection result. On the contrary, in the example of FIG. 14, the detecting unit 13 combines a plurality of logics of the detecting unit 13 described above so as to control the switching of the static image processing. In this manner, in the example of FIG. 14, the static image processing is selected through the combination of the plural logics, so that the jaggy-reduced color-difference signal IP conversion method can be selected at higher accuracy than when a single logic is employed.

Figure 15:
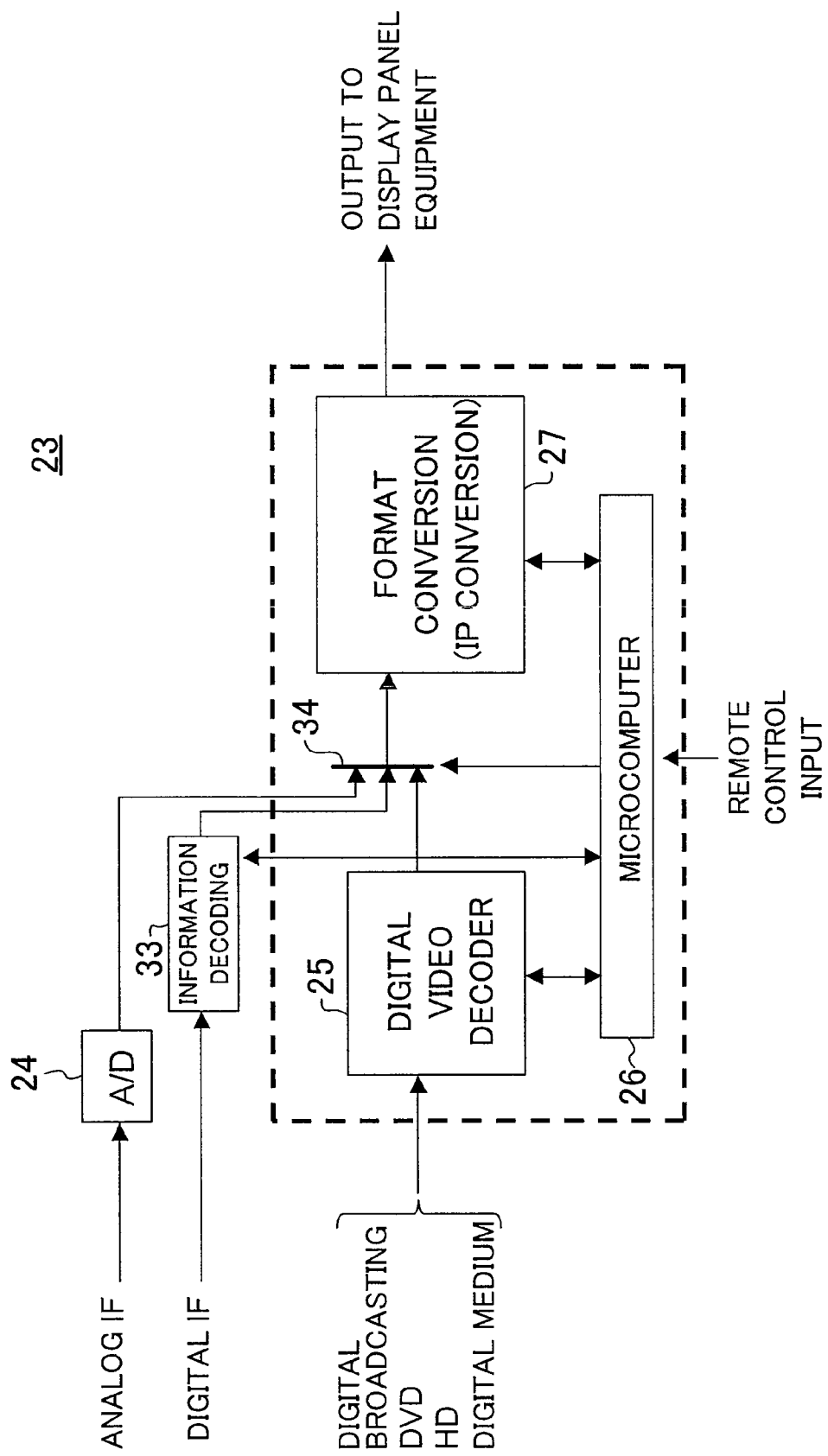
FIG. 15 is a block diagram of a digital image equipment set including a color-difference signal IP converter of this invention.

FIG. 15 is a block diagram of an image associated portion of a digital image equipment set including the color-difference signal IP converter of this invention. In FIG. 15, a reference numeral 23 denotes the digital image equipment set, a reference numeral 24 denotes an A/D converter, a reference numeral 25 denotes a digital video decoder for performing MPEG decoding or the like, a reference numeral 27 denotes a format converting unit including the IP conversion method of this invention, a reference numeral 26 denotes a control microcomputer for controlling the set, a reference numeral 33 denotes an information decoding unit for decoding user data of digital IF such as HDMI, and a reference numeral 34 denotes a selecting unit. An example of the digital image equipment set 23 including an IP converter is various image equipment such as a television set, a digital STB (set top box), a DVD player, a DVD recorder and an HD recorder.

Many kinds of signal sources may be input to the digital image equipment set 23. For example, an input of analog IF may be analog broadcasting or analog connection from a DVD. An input of digital IF may be wired or wireless HDMI connection or DV connection. Also, connection to the digital video decoder 25 can be digital broadcasting in the MPEG state or digital medium, or can be data read from a DVD when the set is a DVD set. In a television set having a display panel, all input signals should be converted by the format converting unit 27 in accordance with the number of pixels of the display panel of the set. When the display panel employs the progressive display, an interlaced input is subjected to the IP conversion by the format converting unit 27. Alternatively, in a digital STB, a DVD player, a DVD recorder, an HD recorder or the like having no display panel, the type of a television set or a monitor to be externally connected cannot be specified, and hence, an image signal is generally output from the set in a plurality of kinds of image formats according to image standard. Also in this case, when an interlaced input is output as a progressive signal, the input is subjected to the IP conversion by the format converting unit 27.

In the IP conversion performed by the format converting unit 27, jaggy of a color-difference signal is detected on the basis of a characteristic of an image signal as described in any of the aforementioned examples, so as to suppress the jaggy as well as retain the resolution. Also when the conversion is controlled at a level of the set, jaggy can be more highly accurately reduced by controlling the conversion in accordance with the output of the detecting unit 13 as described in any of the examples. For example, in some of the aforementioned examples, degradation of a color-difference signal may be rather conspicuous due to error detection. Therefore, it is possible to provide an architecture in which a user actually seeing a picture can arbitrarily select, as the color-difference signal IP conversion static image processing, the conventional inter-field insert, the jaggy-reduced conversion method or automatic detection by using a remote controller. In this manner, in the example shown in FIG. 15, the selection of the static image processing can be manually switched apart from the automatic selection, so that optimum jaggy reduction can be realized in accordance with human visual decision or desire.

Furthermore, in a recent digital IF, for example, in employing the HDMI connection, set information between connected set equipment can be superimposed in a previously determined user data region to be transferred in addition to transfer of simple image signals. When information whether or not a 4:2:2 color-difference signal is obtained through the interpolation of 4:2:0 is included in the user data region, the information can be extracted by the information decoding unit 33. If the 4:2:2 color-difference signal is obtained through the interpolation of 4:2:0, the color-difference signal IP conversion static image processing unit for the IP conversion included in the format converting unit 27 is made to select the jaggy-reduced color-difference signal IP conversion method through the control microcomputer 26. In this manner, in the example of FIG. 15, in the case where digital equipment using a 4:2:2 color-difference signal obtained through the interpolation of 4:2:0 is detected to be connected on the basis of equipment connection information of the digital IF, the jaggy-reduced color-difference signal IP conversion method can be definitely realized.

Moreover, in the digital image equipment set 23 of FIG. 15, a plurality of image signal sources are selected by the selecting unit 34 to be input to the format converting unit 27. In particular, since an output of the digital video decoder 25 is MPEG decoded, it is always a 4:2:2 color-difference signal obtained through the interpolation of 4:2:0. Since the selection of image signals is performed by the control microcomputer 26, in the case where an image signal supplied from the digital video decoder 25 is selected, the jaggy-reduced color-difference signal IP conversion method is simultaneously selected as the color-difference signal IP conversion static image processing.

It is noted that the digital image equipment set 23 is generally realized by using an integrated circuit. Any of various ranges can be employed as the range of an architecture for one chip of the integrated circuit, and in the case where a range surrounded with a broken line in FIG. 15 is included in one chip, namely, the digital video decoder 25 and the format converting unit 27 are integrated, the control microcomputer 26 is operated to select the jaggy-reduced color-difference signal IP conversion method as the color-difference signal IP conversion static image processing simultaneously with the selection of an output of the digital video decoder 25.

In this manner, in the example shown in FIG. 15, in a system or an integrated circuit including an IP converter employing the IP conversion method connected to a plurality of input image signals at least including the digital video decoder 25, the digital video decoder 25 uses a 4:2:0 color-difference signal. Therefore, when an output of the digital decoder is subjected to the IP conversion, the jaggy-reduced static image processing is selected, so as to realize a color-difference signal IP conversion method in which jaggy is definitely reduced.

Figure 16:
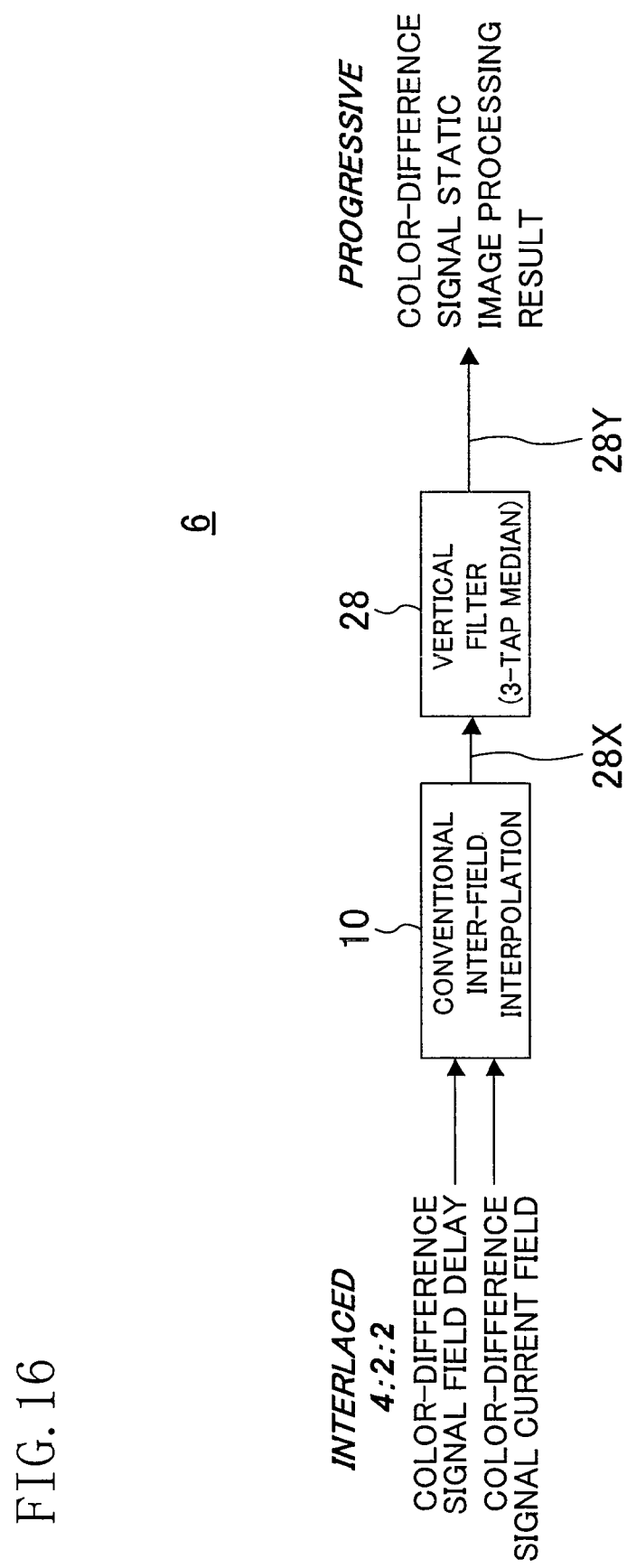
FIG. 16 is a block diagram of still another example of the color-difference signal IP conversion static image processing unit of this invention.

FIG. 16 shows an example in which jaggy is reduced by another method. In FIG. 16, a reference numeral 6 denotes a color-difference signal IP conversion static image processing unit, which corresponds to the portion referred to with the reference numeral 6 in the conventional example of FIG. 21. A reference numeral 10 denotes a conventional inter-field interpolating unit and a reference numeral 28 denotes a vertical 3-tap median filter. An input and an output of the vertical filter 28 are respectively indicated by 28X and 28Y. An output of the conventional inter-field interpolating unit 10 is described with reference to the background art and hence the description is omitted.

FIG. 17A shows a progressive signal resulting from the inter-field insert of a 4:2:2 signal interpolated through the line doubler by the conventional inter-field interpolating unit 10 and it is the same as that shown in FIG. 23C. The example of FIG. 16 is characterized by applying the vertical filter 28 to the progressive signal including jaggy shown in FIG. 17A. The vertical filter 28 has a filter structure for outputting a median of vertically successive three taps. When this filtering processing is performed on the signal of FIG. 17A, a signal shown in FIG. 17B is obtained, and thus, the jaggy can be removed.

In FIGS. 18A and 18B, the vertical filter 28 of this invention is applied to a progressive signal not including jaggy. Specifically, FIG. 18A shows a progressive signal including no jaggy and FIG. 18B shows a signal obtained by applying the vertical filter 28. It is understood that an edge is kept through the filtering for outputting a median.

In this manner, in the example of FIG. 16, when jaggy is caused, the jaggy is reduced by using the median filter 28, and when jaggy is not caused, a color-difference signal IP conversion method in which the frequency characteristic along the vertical direction is not degraded can be realized by using the median filter 28.

Figure 19:
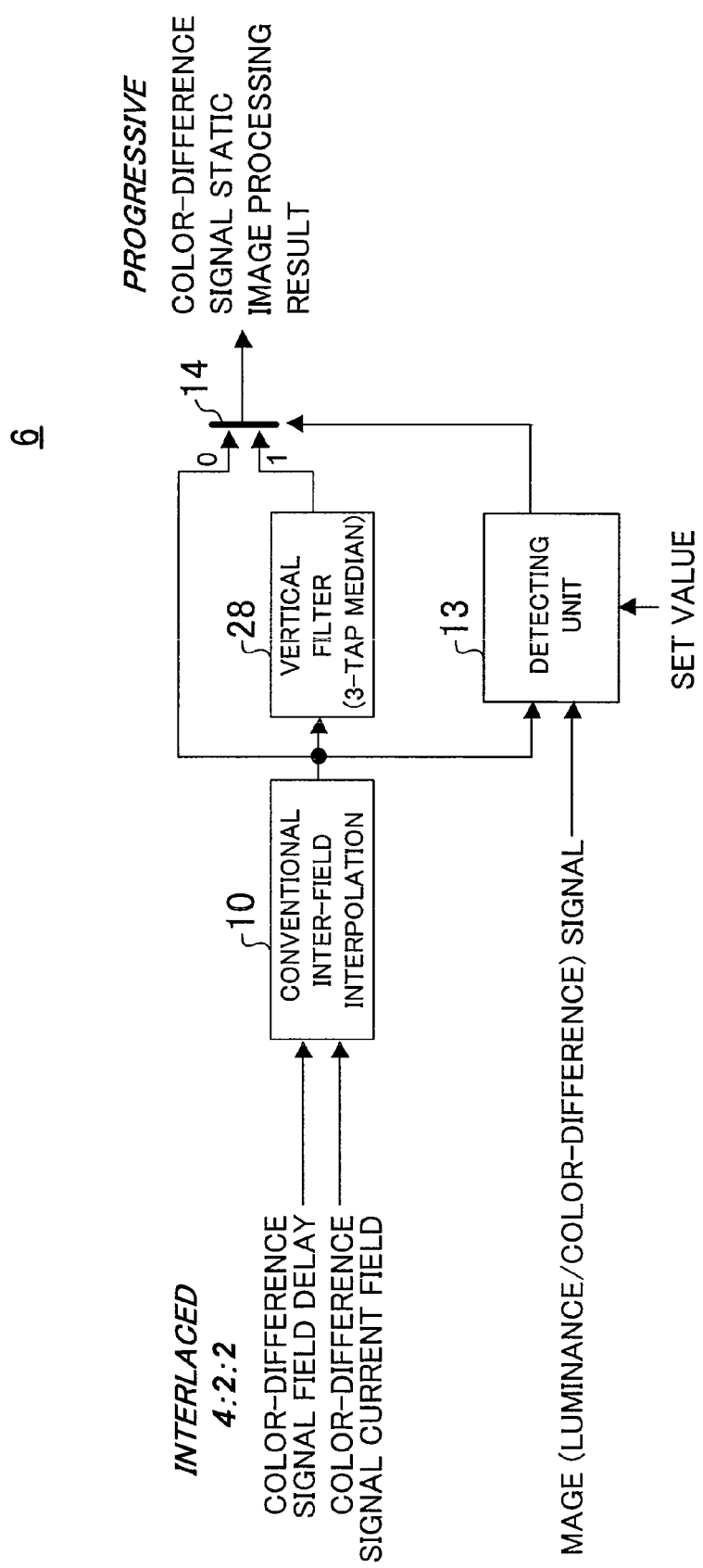
FIG. 19 is a block diagram of still another example of the color-difference signal IP conversion static image processing unit of this invention.

FIG. 19 shows another example in which the vertical filter 28 described with reference to FIGS. 18A and 18B is used. In FIG. 19, a reference numeral 6 denotes a color-difference signal IP conversion static image processing unit, which corresponds to the portion referred to with the reference numeral 6 in the conventional example of FIG. 21. A reference numeral 10 denotes a conventional inter-field interpolating unit, a reference numeral 28 denotes a vertical 3-tap median filter, a reference numeral 13 denotes a detecting unit, and a reference numeral 14 denotes a color-difference static image processing method selecting/mixing unit for selecting/mixing outputs of the conventional inter-field interpolating unit 10 and the vertical filter 28 in accordance with a result obtained by the detecting unit 13. In the example of FIG. 18, although jaggy can be reduced with a vertical edge kept, a portion that is not jaggy may be filtered by the median filter 28 depending upon the pattern type of a picture, and the picture may be degraded in such a case. In the example of FIG. 19, since the detecting unit 13 is provided, the output of the conventional inter-field interpolating unit 10 and the output of the vertical filter 28 can be appropriately switched, so as to minimize the side effect. The operations of the detecting unit 13 and the selecting/mixing unit 14 are completely the same as those described with reference to FIGS. 3, 5, 6, 7, 8, 9, 11, 12 and 13, and hence the description is omitted. Also, as the IP conversion method employed in the format converting unit 27 of FIG. 15, the IP converter shown in FIG. 19 may be applied.

In all of the examples described so far, the logic (0 or 1) of switching the static image processing is not limited to the description, and the switching may be controlled as intended by the invention. Furthermore, although all the examples are described with reference to the block diagrams of hardware image, it goes without saying that the control can be performed by software as far as the same effect is aimed. Furthermore, the inter-field processing is described to be performed on a current field and one field previous to it, but the processing may be performed on a current field and one field following it. Moreover, the number of taps of the vertical filter is not limited to that described above. In addition, in the color-difference signal IP conversion static image processing unit 6 shown in FIG. 1, 10 or 14, although the conventional inter-field interpolating unit 10 and the field interpolating unit 11 for the 4:2:0 state are shown in different blocks, common processing may be shared as far as the results of the respective units can be obtained.

Figure 20:
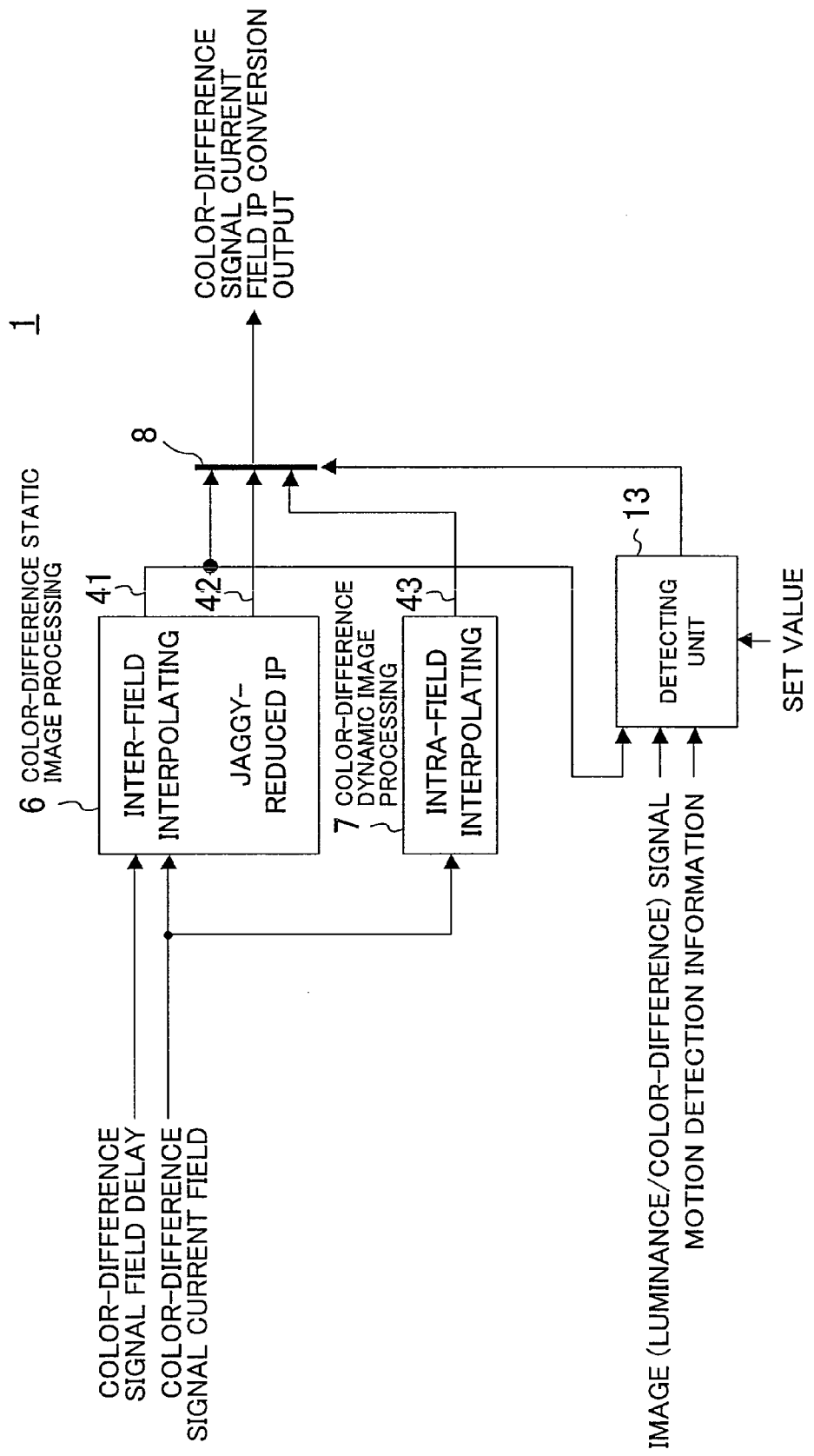
FIG. 20 is a block diagram of a motion adaptive color-difference signal IP converter to which this invention is applied.
Figure 21:
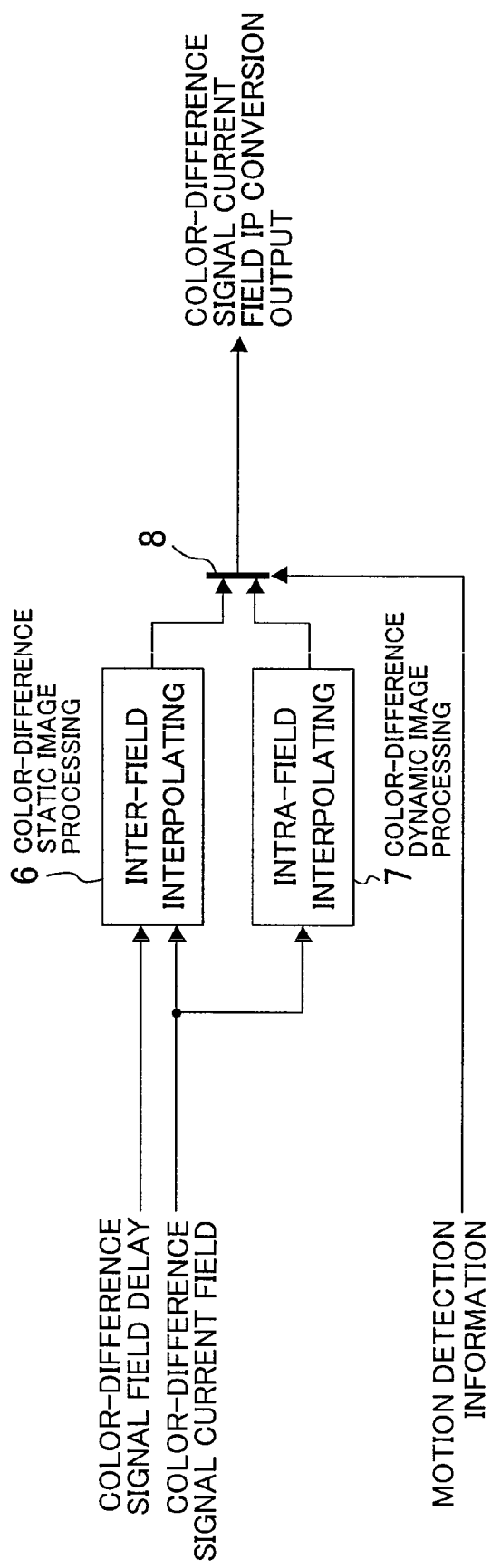
FIG. 21 is a block diagram of a conventional general motion adaptive color-difference signal IP converter.

Furthermore, all the examples are described to be replaced with the color-difference static image processing unit 6 in the conventional motion adaptive IP converter 1 of FIG. 21. Instead, conventional inter-field interpolation 41, jaggy-reduced interpolation 42 and dynamic image intra-field interpolation 43 may be realized, as the whole IP conversion, by using motion detection information and through the switching in accordance with the logic of the detecting unit 13 of any of the aforementioned examples as shown in FIG. 20. Needless to say, the same effect can be exhibited also in this case.

INDUSTRIAL APPLICABILITY

As described so far, according to the color-difference signal IP conversion method of this invention, the color-difference signal IP conversion in which jaggy is reduced and degradation of the initial frequency characteristic of a correct 4:2:2 signal is suppressed in accordance with the origin of an input color-difference signal can be provided, and the invention is useful for static image signal generation or the like for a color-difference signal in the motion adaptive IP conversion.

The invention claimed is:

1. A color-difference signal IP conversion method employed for motion adaptive interlace/progressive (IP) conversion, the method comprising a step of performing static image pixel interpolation of a color-difference signal by selecting or mixing, appropriately for reducing jaggy in an output color-difference signal, a result of first static image processing in which a progressive signal is generated by inserting pixels of successive two fields and a result of second static image processing in which a progressive signal is generated by inserting pixels between data of successive two fields having been decimated in lines and line interpolation is performed on the generated progressive signal correspondingly to decimated lines.

2. The color-difference signal IP conversion method of claim 1,
    wherein the result of the second static image processing is selected when it is determined that an interlaced color-difference signal obtained before the IP conversion is data in which every successive two lines have the same value or a difference between successive two lines is smaller than a given value.

3. The color-difference signal IP conversion method of claim 1,
    wherein the result of the second static image processing is selected when it is determined that an interlaced color-difference signal obtained before the IP conversion has a value in a range between values of upper and lower pixels or in a range larger by a given width than the range between the values of the upper and lower pixels.

4. The color-difference signal IP conversion method of claim 1,
    wherein the result of the second static image processing is selected when a vertical high component of an interlaced color-difference signal obtained before the IP conversion is smaller than a given value.

5. The color-difference signal IP conversion method of claim 1,
    wherein the method further includes a step of detecting whether or not an ID1 signal is superimposed in a vertical blanking period of an interlaced image signal obtained before the IP conversion, and the result of the second static image processing is selected when the ID1 signal is superimposed.

6. The color-difference signal IP conversion method of claim 1,
    wherein the result of the second static image processing is selected with respect to a pixel in which a value of a luminance signal is smaller than a luminance signal given value and a value of a color-difference signal is larger than a color-difference signal given value in an interlaced state obtained before the IP conversion.

7. The color-difference signal IP conversion method of claim 1,
wherein a mixing ratio of the result of the second static image processing to the result of the first static image processing is increased with respect to a pixel in which a value of a luminance signal is smaller than a luminance signal given value and a value of a color-difference signal is larger than a color-difference signal given value in an interlaced state obtained before the IP conversion.

8. The color-difference signal IP conversion method of claim 1,
wherein the result of the second static image processing is selected when it is determined that a value of the progressive color-difference signal obtained as the result of the first static image processing is out of a range between values of upper and lower color-difference signals or a range larger by a given width than the range between the values of the upper and lower color-difference signals.

9. The color-difference signal IP conversion method of claim 1,
wherein the result of the second static image processing is selected when a vertical high component of the progressive signal obtained as the result of the first static image processing is larger than a given value.

10. The color-difference signal IP conversion method of claim 1,
wherein the results of the first and second static image processing are selected or mixed through a combination of two or more logics of claims 2 through 9.

11. The color-difference signal IP conversion method of claim 1,
wherein a user switches, in a set including the IP conversion method, selection of the first static image processing, selection of the second static image processing or selection according to claim 10.

12. The color-difference signal IP conversion method of claim 1,
wherein the result of the second static image processing is selected when digital equipment is detected to be connected on the basis of digital IF equipment connection information to be detected by a set microcomputer including the IP conversion method, and
the digital equipment is detected to be connected by detecting that a color-difference signal is a signal having been decoded from a 4:2:0 signal to a 4:2:2 signal to be connected to the IP conversion method.

13. The color-difference signal IP conversion method of claim 1,
wherein the result of the second static image processing is selected, in a system or an integrated circuit including an IP converter that employs the IP conversion method and is connected to a plurality of input image signals at least including a digital image signal decoder, when an output of the digital image signal decoder is selected as an input of the IP converter.

* * * * *